United States Patent
Kuraoka

(10) Patent No.: US 9,183,872 B2
(45) Date of Patent: Nov. 10, 2015

(54) RECORDING CONTROL DEVICE AND METHOD

(71) Applicant: Sony Corporation, Tokyo (JP)

(72) Inventor: Tomotaka Kuraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/045,130

(22) Filed: Oct. 3, 2013

(65) Prior Publication Data

US 2014/0098655 A1   Apr. 10, 2014

(30) Foreign Application Priority Data

Oct. 10, 2012   (JP) ................................ 2012-224658

(51) Int. Cl.

| | | |
|---|---|---|
| *G11B 7/013* | (2006.01) | |
| *G11B 7/085* | (2006.01) | |
| *G11B 20/10* | (2006.01) | |
| *G11B 20/12* | (2006.01) | |
| G11B 7/24038 | (2013.01) | |
| G11B 7/005 | (2006.01) | |

(52) U.S. Cl.
CPC ............ *G11B 7/013* (2013.01); *G11B 20/10* (2013.01); *G11B 20/1217* (2013.01); *G11B 7/005* (2013.01); *G11B 7/24038* (2013.01)

(58) Field of Classification Search
None
See application file for complete search history.

(56) References Cited

U.S. PATENT DOCUMENTS

| | | | | |
|---|---|---|---|---|
| 2004/0076084 | A1* | 4/2004 | Yonezawa | 369/30.1 |
| 2004/0213117 | A1* | 10/2004 | Sasaki | 369/53.24 |
| 2006/0007847 | A1* | 1/2006 | Lee | 369/275.3 |
| 2006/0285462 | A1* | 12/2006 | Mori | 369/53.17 |
| 2007/0041283 | A1* | 2/2007 | Tateishi | 369/30.04 |
| 2007/0177472 | A1* | 8/2007 | Miura et al. | 369/47.22 |
| 2007/0217298 | A1* | 9/2007 | Koda et al. | 369/30.23 |
| 2009/0073844 | A1* | 3/2009 | Sasa | 369/94 |
| 2010/0067339 | A1* | 3/2010 | Kaida et al. | 369/53.17 |
| 2011/0090772 | A1* | 4/2011 | Nakamura | 369/47.14 |

FOREIGN PATENT DOCUMENTS

JP   2009-123331 A   6/2009

OTHER PUBLICATIONS

Osta.Org "Universal Disk Format Specification", Optical Storage Technology Association, Apr. 30, 2003, 165 pages, Revision 2.50.

* cited by examiner

*Primary Examiner* — Dionne Pendleton
(74) *Attorney, Agent, or Firm* — Sony Corporation

(57) ABSTRACT

There is provided a recording control device including a recording control section which controls data recording to a recording medium by irradiating laser light to the recording medium, and a division section which divides the sequential recording range of a prescribed recording layer, near a boundary of two mutually adjacent sequential recording ranges of the recording layer on a back side of the prescribed recording layer when viewed from a laser incident surface of the recording medium, in a case where data is not recorded to an area of one of the two sequential recording ranges, by setting, as a division position in the prescribed recording layer, a position separated by only a prescribed distance, from a position identical to a position of the boundary, on the other side of the two sequential recording ranges in a direction connecting a center and outer peripheral of the recording medium.

11 Claims, 28 Drawing Sheets

FIG. 17
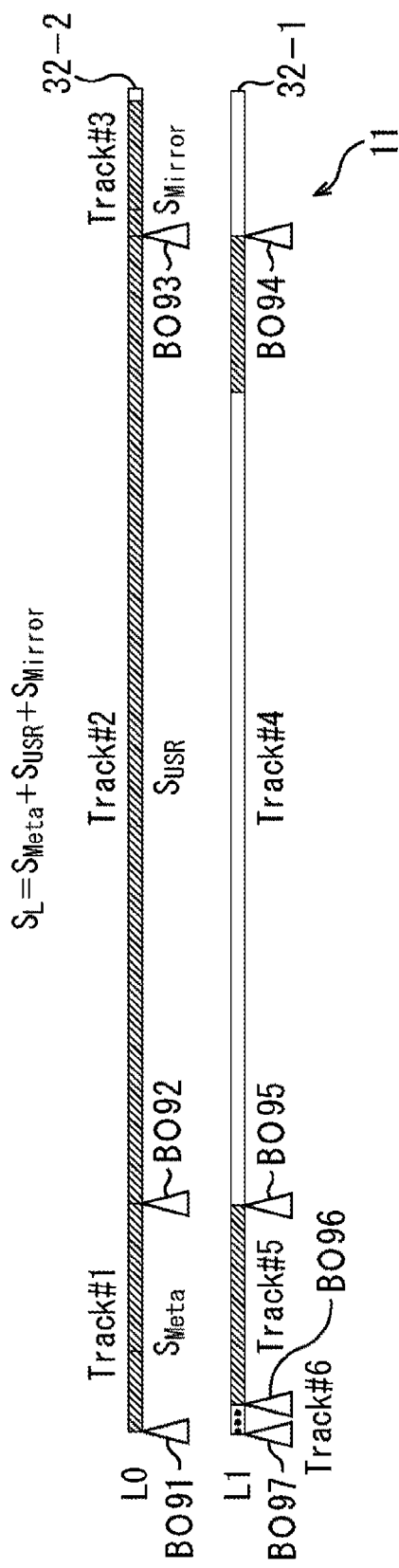
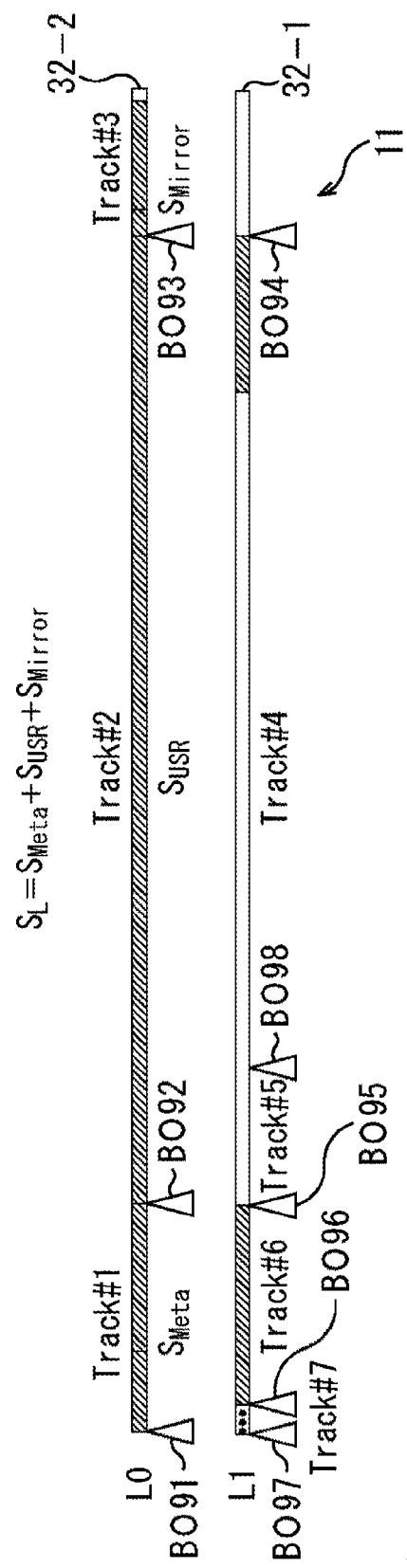

RECORDING CONTROL DEVICE AND METHOD

BACKGROUND

The present disclosure relates to a recording control device and method, and more specifically relates to a recording control device and method which can improve the reliability of data recording to a multilayered optical disk.

In the related art, optical disk recording mediums (hereinafter, simply called optical disks), such as a CD (Compact Disc), a DVD (Digital Versatile Disc), or a BD (Blu-ray Disc: registered trademark), for example, have been widespread as optical recording mediums to/from which recording and reproduction of signals are performed by irradiation of light (For example, refer to "Universal Disk Format Specification Revision 2.50" OSTA, 2003, and JP 2009-123331A).

In such optical disks, a large storage capacity is achieved by attempting to improve the information recording density. Specifically, techniques have been adopted which improve the recording density in the radial direction by reducing the pitch for forming tracks as pit columns or mark columns, or which improve the recording density of the direction orthogonal to the radial direction by reducing the size of the pits or marks.

On the other hand, when attempting to increase the recording capacity, techniques which increase the number of recording layers (layers) have also been effective, and two-layered disks or multilayered disks having three or more layers have been proposed and put into practice under the present conditions.

SUMMARY

Incidentally, there is a demand in multilayered optical disks for effectively managing tracks (sequential recording ranges) on which user data and management information are recorded, and for improving the reliability and operating efficiency.

For example, in the optical disk, the layer on the back side when viewed from the laser incident surface will be affected by the recording state of the layer on the front side. That is, when performing recording to a prescribed layer, it is not preferable for the layer of the front side, through which laser light passes, to have finished recording. Depending on the disk type, when the layer of the front side has finished recording, appropriate data will not be able to be recorded to an area, in the layer of the back side, which overlaps the area which has finished recording, and the reliability of data recording will decrease.

The present disclosure is performed by considering such a situation, and can improve the reliability of data recording to the optical disk.

According to an embodiment of the present technology, there is provided a recording control device including a recording control section which controls data recording to a recording medium by irradiating laser light to the recording medium, the recording medium having a plurality of recording layers on which data recording is performed, and having a number of sequential recording ranges for different recording purposes on each of the recording layers, and a division section which divides the sequential recording range of a prescribed recording layer, near a boundary of two mutually adjacent sequential recording ranges of the recording layer on a back side of the prescribed recording layer when viewed from a laser incident surface of the recording medium, in a case where data is not recorded to an area of one of the two sequential recording ranges, by setting, as a division position in the prescribed recording layer, a position separated by only a prescribed distance, from a position identical to a position of the boundary, on the other side of the two sequential recording ranges in a direction connecting a center and outer peripheral of the recording medium.

The division section may determine a buffer amount based on a position of the boundary in the direction, and set, as the division position, a position separated by only the buffer amount along a recording direction of data, from a position identical to a position of the boundary on the prescribed recording layer in the direction.

At least one of the sequential recording range intended for recording of management information, the sequential recording range intended for recording of user data, and the sequential recording range intended for recording of mirror data of the management information, may be formed on the recording layers.

The sequential recording ranges may be arranged, in the recording layers, in a spiral shape from the center to the outer peripheral of the recording layers.

The recording medium may be a recording medium in which a recording direction of data is different for the mutually adjacent recording layers.

According to an embodiment of the present technology, there is provided a recording control method including controlling data recording to a recording medium by irradiating laser light to the recording medium, the recording medium having a plurality of recording layers on which data recording is performed, and having a number of sequential recording ranges for different recording purposes on each of the recording layers, and dividing the sequential recording range of a prescribed recording layer, near a boundary of two mutually adjacent sequential recording ranges of the recording layer on a back side of the prescribed recording layer when viewed from a laser incident surface of the recording medium, in the case where data is not recorded to an area of one of the two sequential recording ranges, by setting, as a division position in the prescribed recording layer, a position separated by only a prescribed distance, from a position identical to a position of the boundary, on the other side of the two sequential recording ranges in a direction connecting the center and outer peripheral of the recording medium.

In an embodiment of the present disclosure, data recording to a recording medium is controlled by irradiating laser light to the recording medium, wherein the recording medium has a plurality of recording layers on which data recording is performed, and a number of sequential recording ranges for different recording purposes are formed on each of the recording layers, and the sequential recording range of a prescribed recording layer is divided, near a boundary of two mutually adjacent sequential recording ranges of the recording layer on a back side of the prescribed recording layer when viewed from a laser incident surface of the recording medium, in the case where data is not recorded to an area of one of the two sequential recording ranges, by setting, as a division position in the prescribed recording layer, a position separated by only a prescribed distance, from a position the same as that of the boundary, on the other side of the two sequential recording ranges in a direction connecting the center and outer peripheral of the recording medium.

According to an embodiment of the present disclosure, the reliability of data recording to the optical disk can be improved.

BRIEF DESCRIPTION OF THE DRAWINGS

FIG. 17 is a figure which describes the division of tracks;

DETAILED DESCRIPTION OF THE EMBODIMENT(S)

Figure 1:
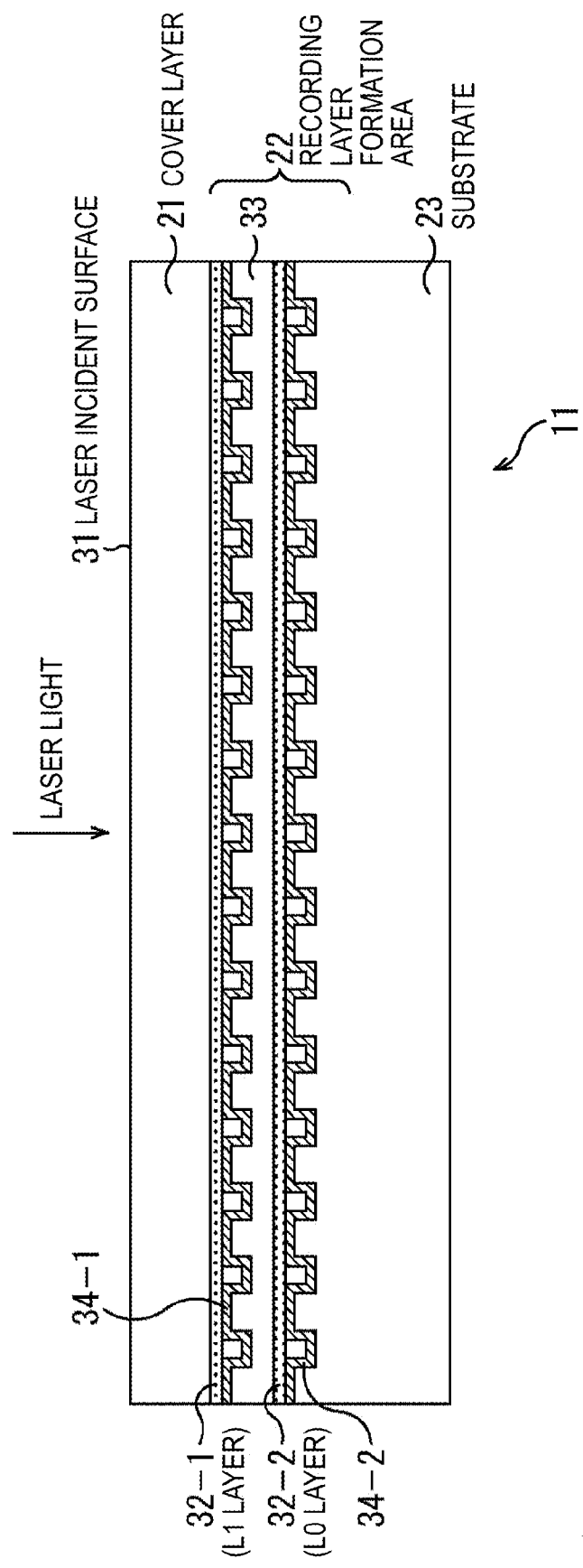
FIG. 1 is a figure which shows a configuration example of an optical disk.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the embodiments applicable to the present disclosure will be described with reference to the figures.

The First Embodiment

[The Recording Medium]

First, a multilayered recording medium according to an embodiment of the present disclosure, to which data is recorded and from which data is read, will be described.

This multilayered recording medium is set, for example, as a WO (Write Once) optical disk or the like which has a plurality of recording layers (layers). Note that hereinafter, while a description will be continued for a multilayered recording medium as the optical disk, the optical disk described hereinafter is one example of a multilayered recording medium, and it may have any type of structure or form of recording layers and the like.

For example, an optical disk as a multilayered recording medium is set as an OTP (Opposite Track Path) type WO multilayered disk or the like in which the recording direction of data is different for mutually adjacent layers (recording layers). In a cross-section of such an optical disk, such as shown in FIG. 1, for example, a plurality of recording layers are formed.

A cover layer 21, a recording layer formation area 22, and a substrate 23 are included, in this order from the top side within the figure, in an optical disk 11 shown in FIG. 1. Also, the recording and reading of data to/from the recording layer formation area 22 are both performed, by irradiating laser light from the side of a laser incident surface 31 on the surface of the cover layer 21.

Note that in the description hereinafter, on the basis of the incident direction of laser light to the optical disk 11, the side of the laser incident surface 31 in the optical disk 11 will be called the front side, and the side of the recording layer formation area 22 in the optical disk 11 will be called the back side.

The cover layer 21 is constituted by resin, for example, and functions as a protective layer of the recording layer formation area 22 formed on the back side of this.

Two recording layers 32-1 and 32-2 on which data is recorded are included in the recording layer formation area 22, and an intermediate layer 33 is included between the recording layer 32-1 and the recording layer 32-2. Note that, hereinafter, in the case where it is not necessary to particularly distinguish the recording layer 32-1 and the recording layer 32-2, they will simply be called the recording layer 32.

For example, the recording layer 32 is constituted by a semi-transparent recording film, and the intermediate layer 33 is constituted by a resin material such as a thermoplastic resin or an ultraviolet-curable resin. Further, grooves 34-1 and grooves 34-2 are each included as position guides (convex and concave patterns) in the recording layer 32-1 and the recording layer 32-2, respectively. Hereinafter, in the case where it is not necessary to particularly distinguish the grooves 34-1 and the grooves 34-2, they will simply be called the grooves 34. These grooves 34 are used as address information of the recording layer 32.

Note that, in this example, the recording layer 32-1 of the front side is set as an L1 layer, and the recording layer 32-2 of the back side is set as an L0 layer. For example, in the case where there are three or more recording layers 32, the recording layers 32 and intermediate layers 33 are alternately included, and each of the recording layers 32 are set as an L0 layer, an L1 layer, an L2 layer, an L3, layer, . . . , and an Lk layer (however, k is an arbitrary integer), in this order from the back side.

Recording mark columns are formed in accordance with a recording operation of data on the recording layer 32 included in such an optical disk 11. Note that, the recording mark columns here are tracks formed, for example, in a spiral shape on the optical disk, and have the meaning of units of sequentially recorded ranges.

[Configuration Example of the Recording System]

Figure 2:
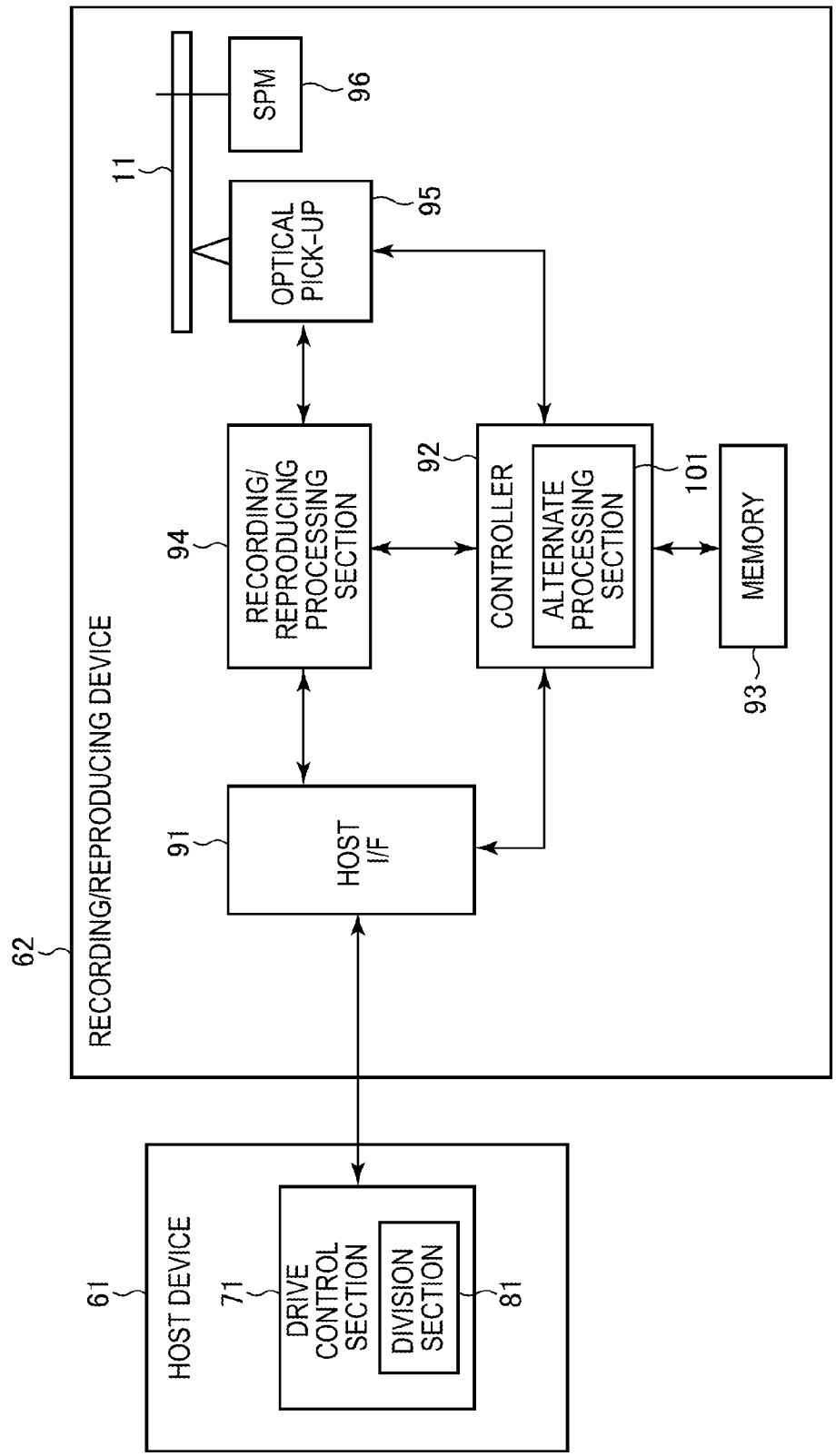
FIG. 2 is a figure which shows a configuration example of a recording system.

To continue, a configuration of a recording system applicable to the present disclosure will be described. FIG. 2 is a figure which shows a configuration example of an embodiment of a recording system applicable to the present disclosure. Note that, the same reference numerals in FIG. 2 denote parts corresponding to the case of FIG. 1, and the description of them will be suitably omitted.

The recording system shown in FIG. 2 performs recording of data to the optical disk 11 and reading of data from the optical disk 11, and is constituted by a host device 61 and a recording/reproducing device 62.

The host device 61 issues various commands to the recording/reproducing device 62, and recording/reproduction to/from the optical disk 11 is executed by the recording/reproducing device 62. Note that the host device 61 and the recording/reproducing device 62 may be set, for example, as separate devices such as those related to a host computer device and a disk drive device, or the host device 61 and the recording/reproducing device 62 may be included in one device.

The host device 61 includes a drive control section 71, and the drive control section 71 controls the recording and reproduction of data by the recording/reproducing device 62, in accordance with requests by application software or an OS (Operating System).

For example, the drive control section 71 performs file system management conforming to a UDF (Universal Disk Format), by setting a file system constructed in the optical disk 11. Further, the drive control section 71 executes track setting and close track processes for this, and a management state is reflected on the optical disk 11 by instructing the execution of various processes for the recording/reproducing device 62. In particular, the drive control section 71 has a division section 81, and the division section 81 controls the division of tracks of the recording layer 32 on the optical disk 11.

The recording/reproducing device 62 includes a host interface (host I/F) 91, a controller 92, a memory 93, a recording/reproducing processing section 94, an optical pick-up 95, and a spindle motor 96.

The host interface 91 transfers various data by communicating with the host device 61. For example, the host interface 91 supplies various commands supplied from the host device 61 to the controller 92, and supplies recording data supplied from the host device 61 to the recording/reproducing processing section 94. Further, the host interface 91 reads from the optical disk 11, and supplies reproduced data supplied from the recording/reproducing processing section 94 to the host device 61.

The controller 92 controls each section of the recording/reproducing device 62 so that the recording and reproduction of data to/from the optical disk 11, a format process, and the like are executed, in accordance with the various commands supplied from the host device 61 via the host interface 91. In this case, the controller 92 uses the memory 93 as a work area as necessary.

Further, the controller 92 includes an alternate processing section 101, and the alternate processing section 101 performs an alternate process as necessary at the time of performing recording of data to the optical disk 11, and changes the recording destination of the data. The memory 93 performs a transfer of data with the controller 92, functions as a work area used by the controller 92, and records various parameters.

The recording/reproducing processing section 94 performs signal processes and servo operations for the recording and reproduction of data, in accordance with the control of the controller 92. For example, the recording/reproducing processing section 94 records to the optical disk 11 by supplying recording data supplied from the host interface 91 to the optical pick-up 95, and reads from the optical disk 11 by supplying reproduced data supplied from the optical pick-up 95 to the host interface 91.

The optical pick-up 95 irradiates, to the optical disk 11, laser light corresponding to the recording data supplied from the recording/reproducing processing section 94, in accordance with the control of the recording/reproducing processing section 94 and the controller 92, and records the recording data to the optical disk 11. Further, the optical pick-up 95 irradiates laser light to the optical disk 11, in accordance with the control of the recording/reproducing processing section 94 and the controller 92, receives reflected light of this laser light, and supplies signals obtained by this received light to the recording/reproducing processing section 94.

The spindle motor 96 is made to rotate the optical disk 11 mounted on a spindle rotate by rotation driving the spindle.

[The File System]

Next, a track management system of the optical disk 11 and the recording of data in the recording system will be described. Note that track management is performed as file system management by the drive control section 71 of the host device 61.

Further, while the controller 92 of the recording/reproducing device 62 performs recording control in accordance with a write command from the drive control section 71, there are cases where an alternate process is generated at this time. An alternate process is a process, in the case where data is not able to be recorded due to some reason to an area specified as a recording destination (writing destination) of data by a write command, which records the data by setting an area different to this area as a recording destination of the data.

In addition, the drive control section 71 performs, for one layer (recording layer 32) of the optical disk 11, a track setting process which sets a plurality of tracks for different recording purposes, and a close track process which sets each track to a sequential recording completion state.

Note that, a track here is a sequential recording range (SRR). The tracks are formed in a spiral shape, towards the outside from the center of the recording layer 32, in each of the recording layers 32 of the optical disk 11.

Further, closing is when these tracks are in a state where recording has been completed, and are set to a management state in which sequential recording of the sequential recording range is not able to be used hereafter. The controller 92 of the recording/reproducing device 62 performs a recording operation targeted to such tracks on the file system management by the drive control section 71.

Figure 3:
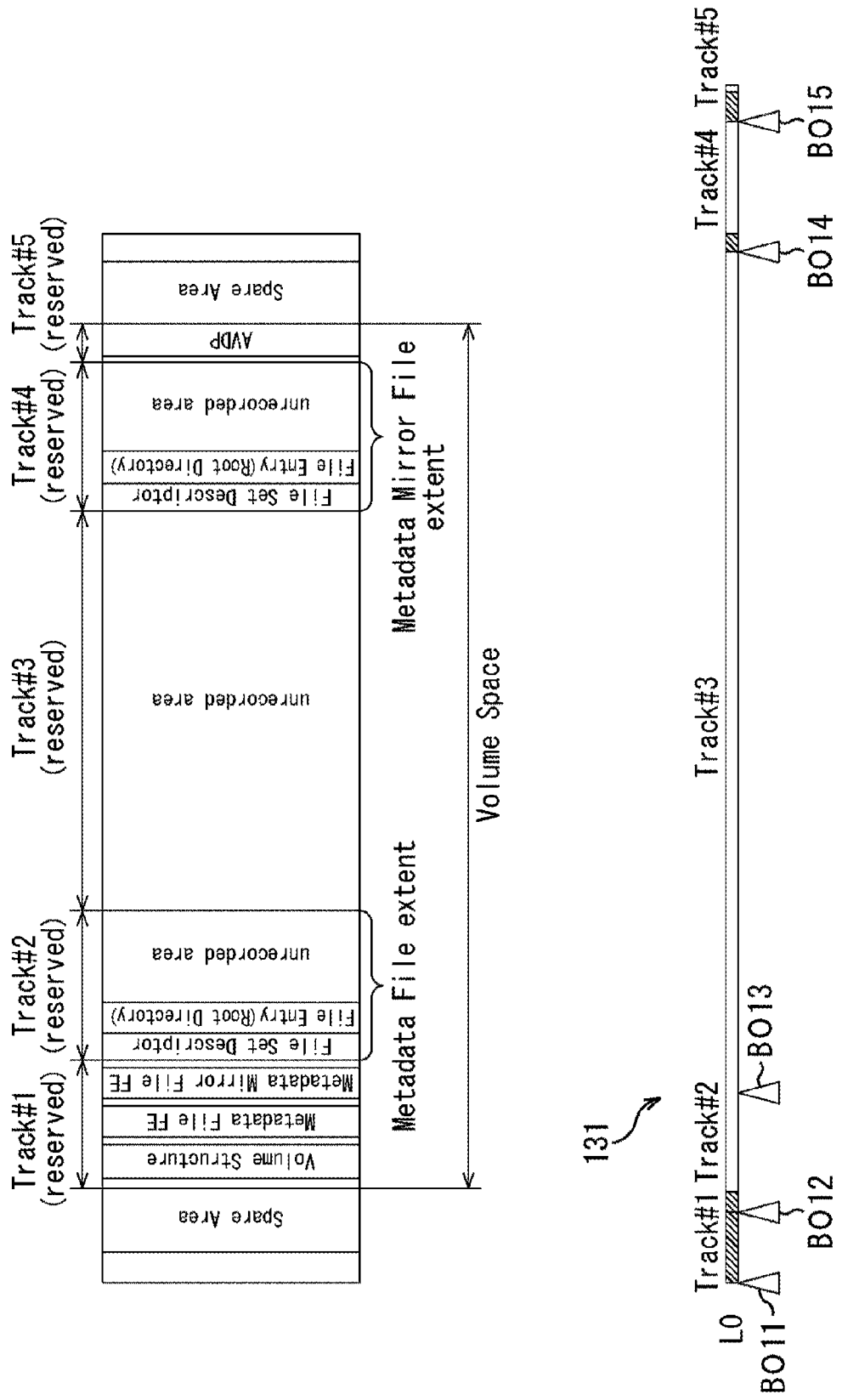
FIG. 3 is a figure which describes a single-layered file system.

Here, first as a comparative example for the present embodiment, a logical layout and a physical layout conforming to a file system used by an optical disk with one layer (a single-layered optical disk), that is, conforming to UDF, is shown in FIG. 3.

In FIG. 3, a logical layout of the file system is shown in the upper part within the figure, and a physical layout of the file system is shown in the lower part within the figure. Note that in the physical layout of the file system, the left side within the figure of the recording layer 131 of the optical disk is the center side of the optical disk, and the right side within the figure of the recording layer 131 shows the outer peripheral side of the optical disk.

In the logical layout shown in the lower part within the figure, five tracks #1 through to #5, that is, track #1 through to track #5, are set in a volume space of the optical disk. Note that a spare area (Alternate Area) is set outside of the volume space.

Here, each of the tracks shown in FIG. 3 are units on which data is sequentially recorded to the physical areas on the optical disk, and each corresponds to the above described sequential recording range (SRR).

In this example, track #1 becomes an address space on which management information, such as a volume structure, a metadata file FE (Metadata File File Entry) and a metadata mirror file FE (Metadata Mirror File File Entry), is recorded.

Track #2 is a sequential recording range of a metadata file, and becomes an address space on which a file set descriptor and a file entry as a root directory are recorded.

Track #3 becomes an address space on which user data, for example, is sequentially recorded. Track #4 is a sequential recording range of a metadata mirror file (a copy of the metadata), and becomes an address space on which a file set descriptor and a file entry are recorded.

Track #5 becomes an address space on which an AVDP (Anchor Volume Descriptor Pointer) is recorded. Note that the details for each of the above described types of data (a volume structure, a metadata file FE, a metadata mirror file FE, a file set descriptor, an AVDP and the like) are disclosed in "Universal Disk Format Specification Revision 2.50" OSTA, 2003.

In the physical layout shown in the lower part within the figure, these tracks #1 through to #5 are physically arranged on a layer L0, that is, on the recording layer 131, of a single-layered optical disk. Here, boundary positions BO11 through to BO15 showing each position of a radial direction, that is, a horizontal direction within the figure, of the recording layer 131 show the boundary positions of each of the tracks.

In each of the tracks #1 through to #5, an NWA (Next Writable Address) is updated to an address following an already recorded address, in accordance with each data recording, and the recording of data from the addresses shown by the NWA is performed at the time of performing the recording of data. In this way, recording progresses for each of the tracks #1 through to #5 by sequentially using the physical areas within the tracks.

Note that the shaded portion within each track in FIG. 3 represents the areas in which the recording of data has been performed, that is, the areas in which data recording is completed. Hereinafter, the shaded portions in the tracks of each recording layer will represent the areas in which data recording is completed.

In this way, in a single-layered optical disk, since the physical recording area is the layer L0, that is, is only the L0 layer, each track is consequently formed on the layer L0.

Figure 4:
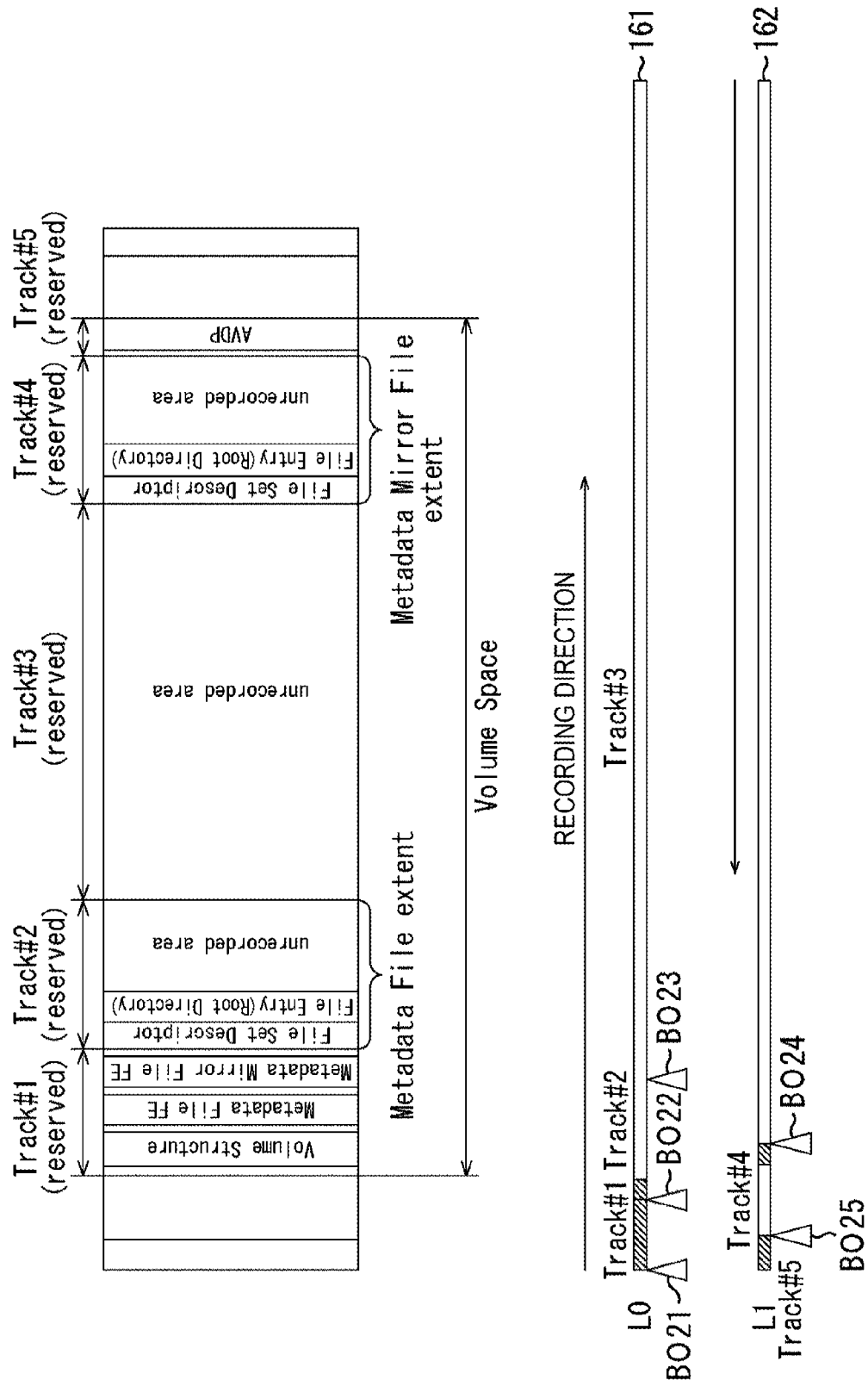
FIG. 4 is a figure which describes a multilayered file system.

To continue, an example of a multilayered optical disk is shown in FIG. 4 as a comparative example. Note that in FIG. 4, a logical layout of the file system is shown in the upper part within the figure, and a physical layout of the file system is shown in the lower part within the figure. Further, since the logical layout of the file system in this example is the same as that of the example of FIG. 3, this description will be omitted.

An arrangement example of physical tracks for a two-layered optical disk is shown in the lower part of FIG. 4. In this example, a recording layer 161 positioned on the back side and a recording layer 162 positioned on the front side are included as recording layers in the optical disk, and the recording layer 161 is the L0 layer and the recording layer 162 is the L1 layer. Further, the left side within the figure of the recording layers of the optical disk is the center side of the optical disk, and the right side within the figure of the recording layers shows the outer peripheral side of the optical disk.

In addition, in the L0 layer (layer L0), the recording direction of data is towards the right direction within the figure, and data is recorded from the left towards the right direction on the recording layer 161. In contrast to this, in the L1 layer (layer L1), the recording direction of data is towards the left direction, and data is recorded from the right towards the left direction on the recording layer 162.

In the example of FIG. 4, track recording of the logical layout is implemented by using the areas of the layer L0 and the layer L1. That is, the layer L0 and the layer L1 are set as one physical recording space, and tracks #1 through to #5 are set. Further, boundary positions BO21 through to BO25 are the boundary positions of each of the tracks.

Specifically, track #1 and track #2 are set within the layer L0, and track #3 is set across a range of the layer L0 and the layer L1. Also, track #4 and track #5 are set on an edge area of the optical disk center side of the layer L1.

In the example of FIG. 4, in a multilayered optical disk, a file system corresponding to a single-layered optical disk is only applied by extending throughout each of the recording layers as they are.

However, when such a file system is applied in a multilayered optical disk, the operating efficiency and reliability will decrease at the time of performing data recording.

Specifically, for example, when performing writing of a metadata file (hereinafter, simply called metadata), the operating efficiency of data recording will decrease for the writing of a metadata mirror file (hereinafter, simply called a metadata mirror). For example, when attempting to record a metadata file and a metadata mirror file, since significant movement from the layer L0 to the layer L1 may be necessary, a decrease of this operating efficiency will become noticeable as the layer number of the optical disk increases.

Further, in a recording condition of the layer of the front side when viewed from the side of the laser incident surface, a case where the layer of the back side will be affected and appropriate recording is not able to be executed will easily occur.

For example, when recording of the metadata mirror progresses in track #4, the layer L1, in which recording is completed, will exist on the side of the laser incident surface for the two areas of track #1 and track #2 positioned directly under the area of track #4 in which recording is completed. Therefore, there is the possibility of interference for the recording of data after track #1 and track #2, for example, the recording of the user data, or for the updating of management information in accordance with this recording. That is, for example, laser light irradiated to the layer L0 is diffused in the layer L1, there is the possibility that appropriate data is not able to be recorded to the tracks of the layer L0, and the reliability of the data recording decreases.

In addition, for example, when an update of the AVDP of track #5 or the like is necessary, in accordance with the recording of track #2 in the layer L0, movement between the layer L0 and the layer L1 may become necessary, and the operating efficiency of the data recording will decrease. Further, when considering the generation of an alternate process, problems will occur such as the consolidation of management information or, a dispersion of the metadata and metadata mirror, for example, not being able to be maintained. For example, when considering defects or the like, it is desirable for the management information file, such as the metadata, and the metadata mirror to be dispersed to reasonably separated positions and then recorded.

In this way, from the viewpoint of the operating efficiency at the time when performing data recording and the reliability of the data recording, it may not be possible to say that the file system and the physical track management system of the multilayered optical disk shown in FIG. 4 are sufficient and appropriate.

Figure 5:
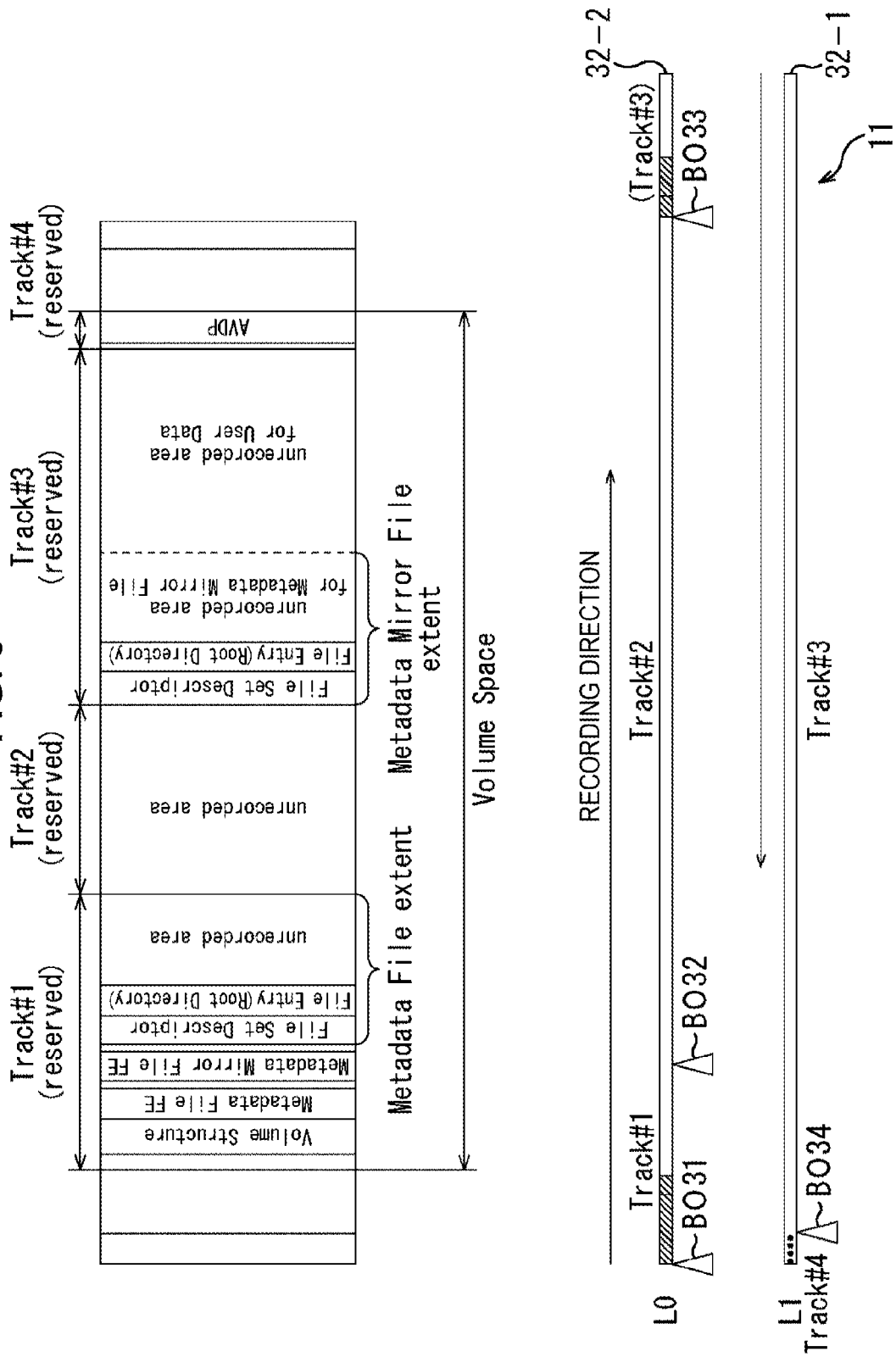
FIG. 5 is a figure which describes a multilayered file system applicable to an embodiment of the present disclosure.

On the other hand, in the present disclosure, track management is performed such as shown in FIG. 5.

A logical layout of a file system conforming to UDF is shown in the upper part within FIG. 5, and a physical layout of the file system is shown in the lower part within the figure.

Note that, the same reference numerals in FIG. 5 denote parts corresponding to the case of FIG. 1, and the description of them will be suitably omitted. Further, in the logical layout of the file system, the left side within the figure of the recording layer 32 of the optical disk 11 is the center side of the radial direction of the optical disk 11, and the right side within the figure of the recording layer 32 shows the outer peripheral side of the radial direction of the optical disk 11. Note that the radial direction is the direction connecting the center and the outer peripheral of the optical disk 11.

In the logical layout shown in the upper part within FIG. 5, four tracks #1 through to #4, that is, track #1 through to track #4, are set in a volume space of the optical disk 11, in an initial state.

In this example, track #1 becomes an address space on which a volume structure, a metadata FE (Metadata File Entry), a metadata mirror file FE (Metadata Mirror File Entry), a file set descriptor, and a file entry as a root directory are recorded. That is, track #1 is set as a management information track intended for the recording of a management information file. Hereinafter, a track intended for the recording of a management information file, such as track #1, will also be called a track for metadata.

Track #2 becomes an address space on which user data, for example, is sequentially recorded. That is, track #2 becomes a track for user data intended for the recording of user data.

Track #3 is a sequential recording range of a metadata mirror file (a copy of the metadata), and becomes an address space on which a file set descriptor and a file entry are recorded. That is, track #3 becomes a track for a mirror intended for the recording of a mirror file of the management information.

Track #4 becomes an address space on which an AVDP is recorded.

In the optical disk 11, such tracks #1 though to track #4, such as shown in the lower part within the figure, are included in the recording layer 32 by a format process, and are set to an initial state.

In this example, track #1 and track #2 are set in the backmost layer L0 when viewed from the side of the laser incident surface 31, and track #3 is set across to the layer L1 on the front side of the layer L0 when viewed from the side of the layer L0 and the laser incident surface 31. In addition, track #4 is set to the edge of the center side of the radial direction of the optical disk 11 in the layer L1, that is, to the edge part of the inner peripheral side. In other words, track #4 is a track positioned at the end of the recording direction.

Further, in FIG. 5, boundary positions BO31 through to BO34 are the boundary positions of each of the tracks. That is, the area from the boundary position BO31 up to the boundary position BO32 of the layer L0 is set as track #1, and the area from the boundary position BO32 up to the boundary position BO33 of the layer L0 is set as track #2. Similarly, the area from the boundary position BO33 of the layer L0 up to the boundary position BO34 of the layer L1 is set as track #3, and the area from the boundary position BO34 up to the edge of the inner peripheral side of the layer L1 is set as track #4.

Note that in each of the layers L0 and L1, recording progresses in an OTP form. That is, in this example, the recording direction of the layer L0 is from the left towards the right direction within the figure, and data is recorded from the inner peripheral towards the outer peripheral of the optical disk 11. On the other hand, the recording direction of the layer L1 is from the right towards the left direction within the figure, and data is recorded from the outer peripheral towards the inner peripheral of the optical disk 11. Further, each of the layers is used in the order from the backmost layer L0 for data recording.

In the optical disk 11, track #1, track #2, track #3, . . . , track #N are set in a recording direction from the edge portion of the inner peripheral side of the layer L0, and the number of the tracks increases in increments of 1 in accordance with the position from the front to the rear side along the recording direction. Further, in the case where one track is divided into a number of tracks, the number of the new tracks will be allocated again.

Incidentally, since track #4 is temporarily set to the final edge portion of the layer L1 on the frontmost side, the recording position of the AVDP is set so as to be appropriate for UDF provisions.

In a file structure of a UDF, such as that which is well known, a volume recognition area used in sequential recording is started by placing 16 sectors from a leading LSN (Logical Sector Number: Logical Address). Also, an anchor point is arranged, for example, at the position of the $256^{th}$ sector, and at the position of the last sector N or the N-$256^{th}$ sector. The track which records an AVDP of the last sector or the N-$256^{th}$ sector becomes track #4 here.

However, track #4 is closed immediately after the setting without actually performing recording of an AVDP or the like. Then, since there is no longer an NWA which is the next writable address in track #4, hereafter, it will become a management state in which actual writing of data to track #4 is not performed.

However, it may be necessary to perform writing of an AVDP or other types of management information at the time of performing a format of the optical disk 11. Also, when the recording of data to track #4 is actually instructed, an alternative process (POW (Pseudo Over Write)) is generated, and the writing of data to the area of an alternate destination is performed.

In the present disclosure such as described above, tracks for different recording purposes are set, such as a track for metadata and a track for user data, for each layer of the optical disk 11. Further, when the entire area of tracks for different recording purposes of a prescribed layer have completed recording, new tracks for different recording purposes are set in the layer on the front side of this layer.

In this way, such as in the example of FIG. 5, for example, since track #1 for metadata and track #3 for a mirror are included in the same layer L0 in an initial state, movement between the layers will not occur at the time of performing recording of the metadata and the metadata mirror, and the operating efficiency can be improved. Further, the distribution of the metadata and the metadata mirror is maintained, and the robustness of the data can be improved.

In addition, in the present disclosure, the reliability of data recording, such as described previously, can be improved by setting tracks for different recording purposes for each layer, and the operating efficiency and reliability at the time of performing data recording can be improved by closing track #4 at the time of performing a format.

[Description of the Format Process]

Therefore, hereinafter, the specific operations of the recording system shown in FIG. 2 will be described.

First, a format process performed by the host device 61 will be described with reference to the flow chart of FIG. 6. This format process is a process which controls the format of a bank disk on which data has not yet been recorded as the optical disk 11, and begins when a format command of the file system is supplied from the host device 61 the drive control section 71.

In step S11, the drive control section 71 acquires disk parameters from the optical disk 11.

That is, when the drive control section 71 instructs the reading of disk parameters to the controller 92 via the host interface 91, the controller 92 is made to read the disk parameters from the optical disk 11, by controlling the optical pick-up 95 and the recording/reproducing processing section 94. The recording/reproducing processing section 94 applies a demodulation process or the like as necessary to the signals supplied from the optical pick-up 95, and supplies the disk parameters obtained as a result of this to the drive control section 71.

In step S12, the drive control section 71 judges whether or not the optical disk 11 mounted in the recording/reproducing device 62 is a blank disk, based on the read disk parameters.

In the case where it is judged that there is no blank disk in step S12, since the optical disk 11 is already formatted, for example, the drive control section 71 supplies a message to the host device 61 that the media is not able to be formatted, and the format process ends.

On the other hand in the case where it is judged that there is a blank disk in step S12, in step S13, the drive control section 71 supplies a Format Unit command to the controller 92, and instructs a physical format of the optical disk 11.

Then, the controller 92 controls the recording/reproducing processing section 94 and the optical pick-up 95, in accordance with the Format Unit command, is made to execute a physical format of the optical disk 11, and supplies information showing this execution result to the drive control section 71.

In step S14, the drive control section 71 judges whether or not an error has occurred at the time of performing the physical format, based on the information supplied from the controller 92.

In the case where it is judged that an error has occurred in step S14, the drive control section 71 outputs a message to the host device 61 that a format error has occurred, and the format process ends.

On the other hand, in the case where it is judged that an error has not occurred in step S14, since the physical format is completed, the process proceeds to step S15, and track setting of the optical disk 11 is performed.

In step S15, the drive control section 71 instructs, to the controller 92, the securing of a track for an AVDP and RVDS (Reserve Volume Descriptor Sequence). Then, the controller 92 sets (reserves) a track used for the recording of the AVDP and RVDS on the optical disk 11, in accordance with the instruction of the drive control section 71.

In this way, the final edge portion on the recording direction side of the layer L1 positioned on the frontmost side of the optical disk 11, such as shown in FIG. 5, for example, is set as track #4 for an AVDP and RVDS.

In step S16, the drive control section 71 instructs, to the controller 92, the closing of the track for an AVDP and RVDS. Then, the controller 92 controls the recording/reproducing processing section 94 and the optical pick-up 95 in accordance with the instruction of the drive control section 71, and is made to close the track specified by the drive control section 71.

In this way, track #4 shown in FIG. 5, for example, is closed in an unrecorded state. Such a closing process is a process for setting the AVDP area to track #4, according to the UDF provisions, closing this track #4, and thereafter recording the AVDP to another location by an alternate process.

Note that an AVDP in a UDF is the point initially read by the host, and is information which is guided from here to all the files on the optical disk. In a UDF, an AVDP provides recording to two or more locations, from among the logical block $256^{th}$ sector, the final sector (Z), and the Z-$256^{th}$ sector.

In step S17, the drive control section 71 instructs, to the controller 92, the securing of a track for metadata. Then, the controller 92 sets a track used for the recording of metadata on the optical disk 11, in accordance with the instruction of the drive control section 71.

In this way, such as shown in FIG. 5, for example, the edge portion of the inner peripheral side of the layer L0 positioned on the backmost side of the optical disk 11, that is, the edge portion of the direction side opposite to the recording direction, is set as track #1 for metadata.

In step S18, the drive control section 71 instructs, to the controller 92, the securing of a track for user data. Then, the controller 92 sets a track used for the recording of user data on the optical disk 11, in accordance with the instruction of the drive control section 71.

In this way, such as shown in FIG. 5, for example, an area, which follows track #1 for metadata of the layer L0 positioned on the backmost side of the optical disk 11, is set as track #2 for user data. As a result, the section up to track #4, which is from track #2 onwards, is set as track #3 which is a track for a transitional mirror.

In step S19, the drive control section 71 creates a UDF structure.

In step S20, the drive control section 71 supplies commands or the like as necessary to the controller 92, and records data such as an AVDP to the track for metadata.

For example, the drive control section 71 supplies an AVDP, an MVDS (Main Volume Descriptor Sequence), a metadata file FE, a metadata mirror file FE, and a metadata file to the recording/reproducing processing section 94, and instructs to the controller 92 the recording to the optical disk 11 of this data.

Then, the controller 92 controls the recording/reproducing processing section 94 and the optical pick-up 95, and controls the recording to the track for metadata on the optical disk 11 of the data supplied from the drive control section 71 to the recording/reproducing processing section 94. In this case, the recording/reproducing processing section 94 modulates data such as an AVDP supplied from the drive control section 71 as necessary, and supplies the modulated data to the optical pick-up 95. Further, the optical pick-up 95 irradiates laser light to the optical disk 11 in accordance with the data supplied from the recording/reproducing processing section 94, and performs recording of data to the optical disk 11.

In this way, the AVDP, the MVDS, the metadata file FE, the metadata mirror file FE, and the metadata file are recorded to track #1 shown in FIG. 5, for example. In this example, since track #1 is in an open state, and the leading position of track #1 is the position of the NWA, data such as an AVDP is written from the position of this NWA.

In step S21, the drive control section 71 judges whether or not an error has occurred at the time of performing writing of data to the track for metadata.

In the case where it is judge that an error has occurred in step S21, that is, in the case where a write error has occurred and there has been a failure in the writing of data, the drive control section 71 outputs a message to the host device 61 that formatting has failed, and the format process ends.

On the other hand, in the case where it is judged that an error has not occurred in step S21, in step S22, the drive control section 71 supplies commands or the like as necessary to the controller 92, and records the metadata mirror to the track for a mirror.

That is, the drive control section 71 supplies the metadata mirror to the recording/reproducing processing section 94, and instructs to the controller 92 the recording to the optical disk 11 of the metadata mirror. Then, the controller 92 controls the recording/reproducing processing section 94 and the optical pick-up 95, and controls the recording of the track for a mirror on the optical disk 11 of the metadata mirror supplied from the drive control section 71 to the recording/reproducing processing section 94.

In this case, the recording/reproducing processing section 94 adjusts the metadata mirror supplied from the drive control section 71 as necessary and supplies the adjusted metadata mirror to the optical pick-up 95, and the optical pick-up 95 irradiates laser light to the optical disk 11 in accordance with the data from the recording/reproducing processing section 94. In this way, the metadata mirror is recorded to track #3 shown in FIG. 5, for example.

In step S23, the drive control section 71 supplies the AVDP and RVDS to the recording/reproducing processing section 94, and records the AVDP and RVDS to a track for an AVDP and RVDS, by instructing to the controller 92 the recording to the optical disk 11 of this data.

Then, the controller 92 controls the recording/reproducing processing section 94 and the optical pick-up 95, and controls the recording to the optical disk 11 of the AVDP and RVDS. The recording/reproducing processing section 94 adjusts the AVDP and RVDS as necessary and supplies the adjusted AVDP and RVDS to the optical pick-up 95, and the optical pick-up 95 irradiates laser light to the optical disk 11 in accordance with this data from the recording/reproducing processing section 94.

In this case, since the track for an AVDP and RVDS is closed by the process of step S16, the controller 92 performs an alternate process, and controls the recording of data so that the AVDP and RVDS are recorded to another track. In this way, the optical disk 11 becomes the initial state shown in FIG. 5, for example. Note that the alternate process, which is performed in the case where data recording is instructed to a closed track, will be described later.

In step S24, the drive control section 71 judges whether or not an error has occurred at the time of performing writing of the AVDP and RVDS.

In the case where it is judged that an error has occurred in step S24, the drive control section 71 outputs a message to the host device 61 that a write error has occurred and that formatting has failed, and the format process ends.

On the other hand, in the case where an error has not occurred in step S24, the drive control section 71 outputs a message to the host device 61 that formatting has ended normally, and the format process ends.

As described above, the host device 61 sets the track for an AVDP and RVDS on the layer of the frontmost side of the optical disk 11, closes this track, and records necessary data, by additionally setting tracks for different recording purposes to the layer of the backmost side.

[The Alternate Process]

Next, the alternate process performed by the recording/reproducing device 62 will be described.

In the case where the drive control section 71 specifies a specified area of the optical disk 11 as a writing destination, and a write command is issued which requests the writing of data, an alternate process will be issued at the time when the area specified as the writing destination is an area to which the writing of data is not able to be performed.

For example, the drive control section 71 specifies an LSN (Logical Sector Number), which is a logical address showing a position on the recording layer 32 of the optical disk 11, in more detail, a sector number, as a writing destination.

Further, when the write command is received from the drive control section 71, the controller 92 converts the LSN showing the writing destination into a PSN (Physical Sector Number), which is a physical address showing a physical position on the recording layer 32 of the optical disk 11, in more detail, a physical sector number. Also, at the time when the position shown by the PSN matches the position of the NWA (Next Writable Address) of the track on the optical disk 11, the controller 92 performs writing of data from the position of the NWA.

On the other hand, at the time when the position shown by the PSN does not match the position of the NWA within the track, the controller 92 (the alternate processing section 101) performs an alternate process, and changes the writing destination of data to another position (hereinafter, called an alternate destination). Then, the controller 92 performs writing of the data by setting the alternate destination as the final writing destination of the data.

Here, in the case where the alternate processing section 101 of the controller 92 determines an alternate destination, the alternate destination is selected in the order from the priority levels shown as follows, that is, in the order of the following first priority through to fourth priority.

(The First Priority)

The writing destination is a track positioned at the end of the optical disk 11, and in the case where this track is closed, an NWA of the outermost peripheral side of the optical disk 11 is set as the alternate destination.

(The Second Priority)

In the case where there is an NWA within the track including the writing destination, this NWA is set as the alternate destination.

(The Third Priority)

The NWA, which has the shortest relative distance of the radial direction of the optical disk 11 between the writing destination and the NWA, from among the NWA of all the layers, is set as the alternate destination.

(The Fourth Priority)

In the case where there are a plurality of NWA, which have the shortest relative distance of the radial direction of the optical disk 11 between the writing destination and the NWA, the NWA of the innermost peripheral side is set as the alternate destination if the writing data is metadata, and the NWA of the outermost peripheral side is set as the alternate destination if the writing data is a metadata mirror.

The alternate processing section 101 determines the alternate destination in the above described order of the first priority through to fourth priority.

Figure 7:
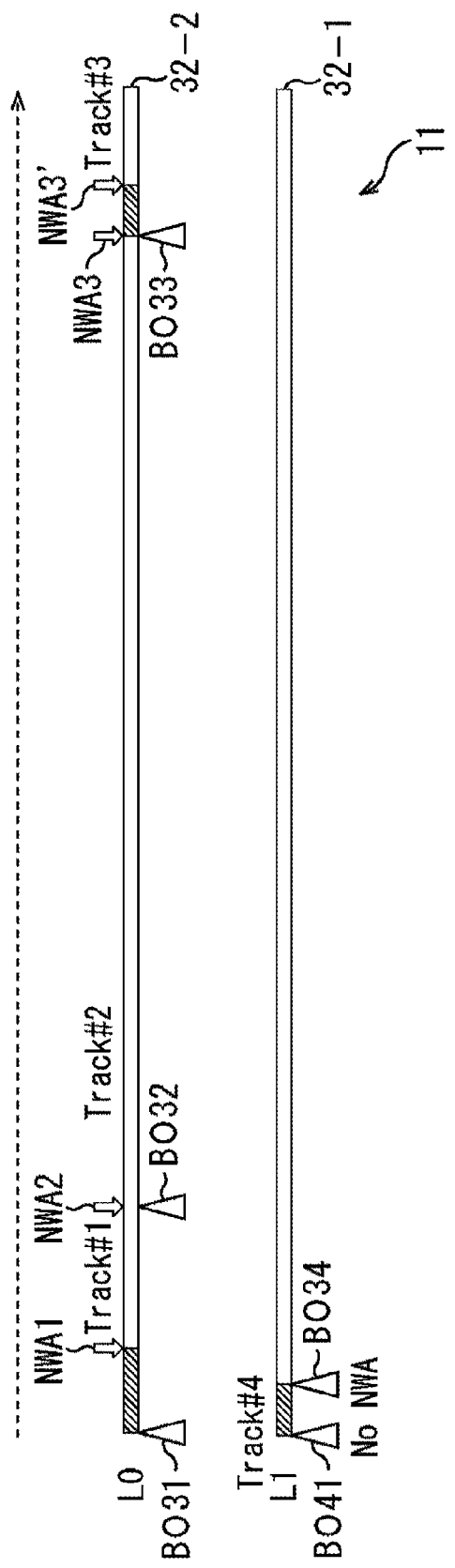
FIG. 7 is a figure which describes an alternate process.

Therefore, such as shown in FIG. 7, for example, in the case where a position within track #4 positioned at the end of the optical disk 11 is specified as the writing destination, the first priority is applied. Note that, the same reference numerals in FIG. 7 denote parts corresponding to the case of FIG. 5, and the description of them will be suitably omitted.

In FIG. 7, tracks #1 through to #4 are set on the optical disk 11, and the NWA within the tracks become NWA1 through to NWA3 for track #1 through to track #3, respectively. Further, since track #4 is closed, an NWA of track #4 does not exist. Here, track #4 is an area from a boundary position BO34 up to a boundary position BO41 positioned at the edge of the inner peripheral side of the layer L1.

In such a state, a write command is issued, and a logical address LSN N is specified as the writing destination of the data. The "N" which follows LSN here is a logical address number. In this case, the controller 92 converts the logical address LSN N into a physical address PSN N, and acquires track information of the track specified by the physical address PSN N. Note that the "N" which follows PSN is a physical address number.

Here, when the position shown by the physical address PSN N is a position within track #4, an alternate process is generated since track #4 is closed.

While whether the conditions are satisfied, in the above described order from the first priority up to the fourth priority, is specified in the alternate process, in this example, track #4 is the track positioned at the end, that is, the track with the largest track number. Further, since track #4 is closed, the first priority is applied.

Accordingly, the alternate processing section 101 selects an alternate destination from among all the NWA of the tracks set in the optical disk 11 at present. In the first priority, since the NWA of the outermost peripheral side of the optical disk 11 is set as the alternate destination, NWA3 in the example of FIG. 7 is determined as the alternate destination. When such an alternate destination is determined, the controller 92 writes the data instructed to be recorded from the position of the NWA3 which is the alternate destination. When the writing of data to track #3 is completed, the position of NWA3 for the portion of the recorded data moves in the recording direction, and is set as NWA3'. Therefore, in the case where data is written to track #3 the next time after this, recording is performed from the position of NWA3'.

Further, the alternate processing section 101 registers information, to the effect that the actual writing destination of the physical address PSN N specified as a writing destination has changed to NWA3, as alternate information.

Figure 6:
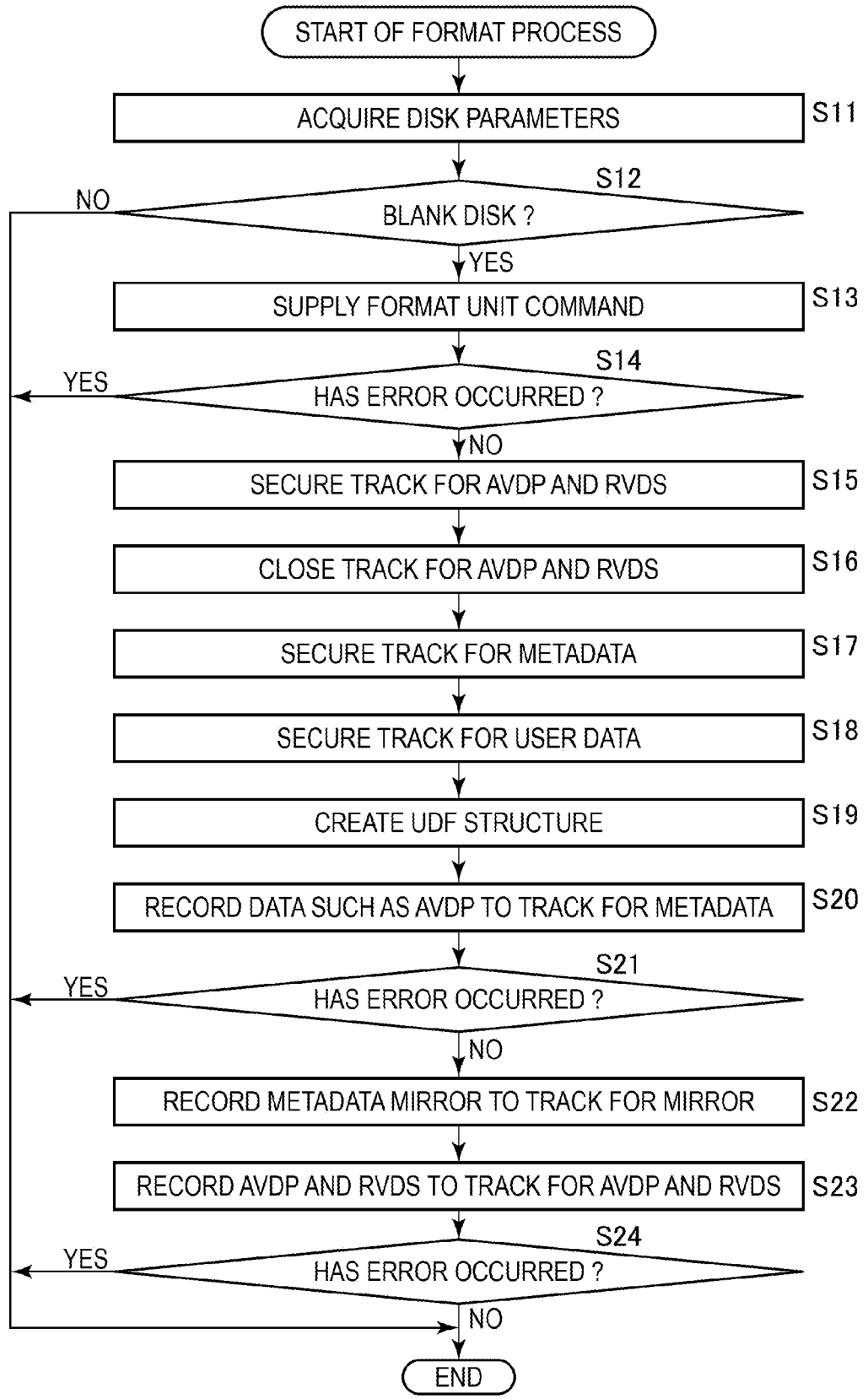
FIG. 6 is a flow chart which describes a format process.

There are cases where such an alternate process performed by the first priority is performed by the process of step S23 of FIG. 6, for example.

In the case where the process of step S23 of FIG. 6 is performed, metadata is written to track #1, a metadata mirror is additionally written to track #3, and thereafter writing of data such as an AVDP to track #4 is instructed. Then, data such as an AVDP instructed to be written to track #4 is written to track #3 by an alternate process.

In such a case, since data is written to all the tracks of the layer L0, it is not necessary for the optical pick-up 95 to move the irradiation destination of laser light from the layer L0 to another layer, in the format process, at the time of performing writing of data. Therefore, the operating efficiency at the time of performing data recording can be improved.

Figure 8:
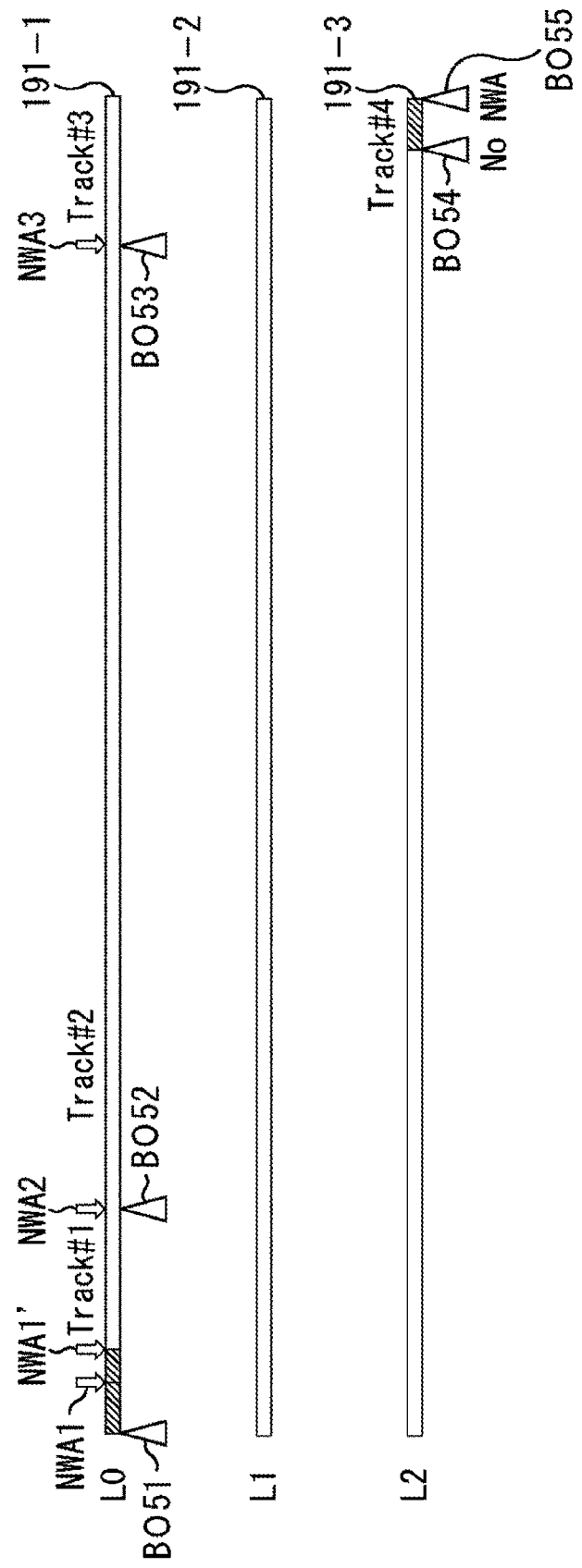
FIG. 8 is a figure which describes an alternate process.

Further, such as shown in FIG. 8, for example, three recording layers 191-1 through to 191-3 are included in an optical disk mounted in the recording/reproducing device 62, and the recording layers 191-1 through to 191-3 are set as layers L0 through to L2, respectively. Here, the layer L0 is the recording layer positioned in the backmost side, and the left side within the figure is a radial direction inner peripheral side of the optical disk. Further, the recording direction of the layers L0 and L2 is towards the right direction within the figure, and the recording direction of the layer L1 is towards the left direction.

In this example, four tracks #1 through to #4 are set on the optical disk, and the NWA within tracks #1 through to #3 are NWA1 through to NWA3, respectively. Further, track #4 is closed, and is in a state in which an NWA does not exist. Note that in FIG. 8, boundary positions BO51 through to BO55 show the boundary positions of each of the tracks.

In such a state, a write command is issued, and a logical address LSN 0 is specified as the writing destination of the data. The controller 92 converts the logical address LSN 0 into a physical address PSN 0.

Here, when the position of the physical address PSN 0 is the leading position of track #1, since the position of the physical address PSN 0 is on a side opposite to the recording direction from the position of the NWA1, data is already recorded to the physical address PSN 0, and an alternate process is generated.

Since track #1, in which the physical address PSN 0 is included, is not the final track, in this case, the first priority is not applied. Further, since the NWA1 exists in track #1, in which the physical address PSN 0 is included, the second priority is applied in this example, and the NWA1 is determined as the alternate destination.

Afterwards, the controller 92 writes the data instructed to be recorded from the position of the NWA1 which is the alternate destination. When the writing of data to track #1 is completed, the position of NWA1 for the portion of the recording data moves in the recording direction, and is set as NWA1'. Further, the alternate processing section 101 registers information, to the effect that the actual writing destination of the physical address PSN 0 specified as a writing destination has changed to NWA1, as alternate information.

Since the concentration of the same type of data is maintained, if such an alternate destination is determined in accordance with the second priority, the reliability of the data is improved, and the operating efficiency at the time of performing data recording and data reading can be improved.

In this example, when track #1 is a track for metadata, the position within track #1 is specified as a writing destination at the time of performing writing of metadata. Therefore, even in the case where the specified metadata is not able to be written to the position specified as the writing destination, the metadata instructed to be written is recorded within the track for metadata, if the NWA within the track including this writing destination is determined as the alternate destination.

In this way, even in the case where an alternate process is generated, the metadata is recorded to the track for metadata, the concentration of the metadata is maintained, and the reliability of the metadata is improved. Further, since management information such as metadata is concentrated in a specified area, the mounting time of the optical disk can be reduced.

Figure 9:
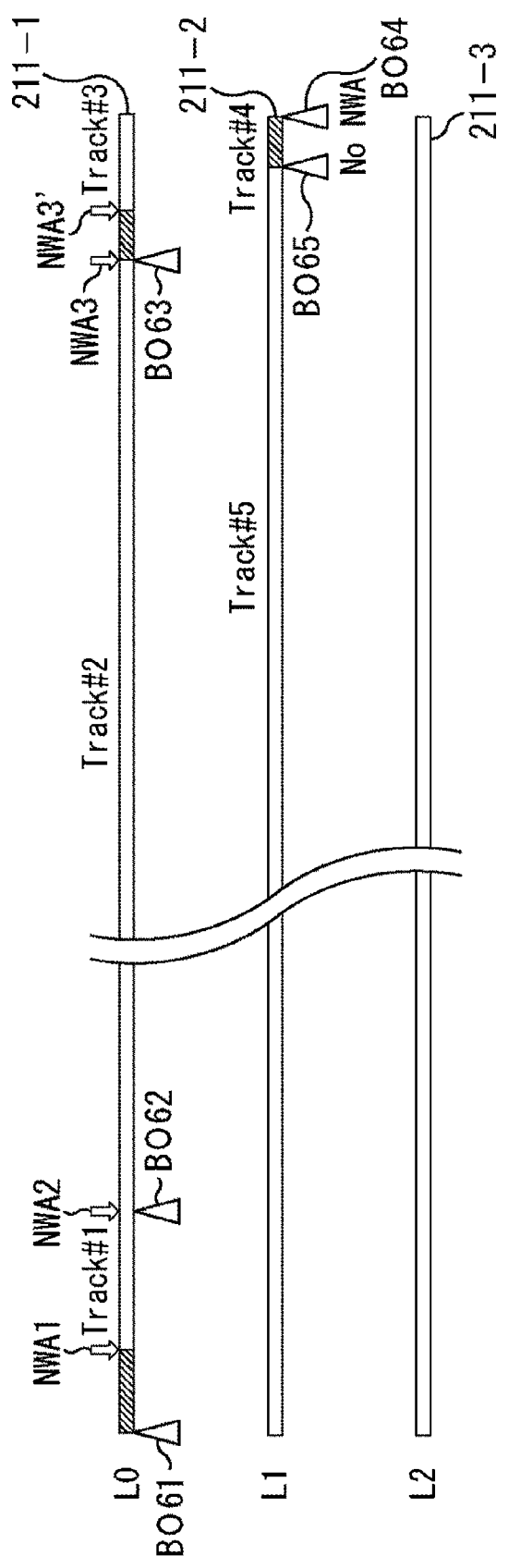
FIG. 9 is a figure which describes an alternate process.

In addition, such as shown in FIG. 9, for example, three recording layers 211-1 through to 211-3 are included in an optical disk mounted in the recording/reproducing device 62, and the recording layers 211-1 through to 211-3 are set as layers L0 through to L2, respectively. Here, the layer L0 is the recording layer positioned in the backmost side, and the left side within the figure is a radial direction inner peripheral side of the optical disk. Further, the recording direction of the layers L0 and L2 is towards the right direction within the figure, and the recording direction of the layer L1 is towards the left direction.

In this example, five tracks #1 through to #5 are set on the optical disk, and the NWA within tracks #1 through to #3 are NWA1 through to NWA3, respectively. Further, track #4 is closed, and is in a state in which an NWA does not exist. Note that in FIG. 9, boundary positions BO61 through to BO65 show the boundary positions of each of the tracks.

In such a state, a write command is issued, and a logical address LSN N is specified as the writing destination of the data. The controller 92 converts the logical address LSN N into a physical address PSN N.

Here, when the position of the physical address PSN N is the final edge position of track #4, since there is no NWA in track #4, in which the physical address PSN N is included, and data is not able to be recorded, an alternate process is generated.

In this case, the first priority is not applied since track #4, in which the physical address PSN N is included, is not the final track, and the second priority is also not applied since there is no NWA within track #4.

Accordingly, the alternate processing section 101 applies the third priority, and determines an NWA, which has the shortest relative distance of the radial direction of the optical disk with the position of the physical address PSN N specified as the writing destination, from among the NWA of all tracks set in the optical disk at present, as the alternate destination.

In this example, the physical address PSN N specified as the writing destination, that is, the NWA3, which has the shortest relative distance with the boundary position BO65 which is the final edge position of track #4, from among NWA1 through to NWA3, is selected as the alternate destination.

When the alternate destination is determined, the controller 92 writes the data instructed to be recorded from the position of the NWA3 which is the alternate destination. When the writing of data to track #3 is completed, the position of NWA3 for the portion of the recording data moves in the recording position, and is set as NWA3'. Further, the alternate processing section 101 registers information, to the effect that the actual writing destination of the physical address PSN N specified as a writing destination has changed to NWA3, as alternate information.

Since data is recorded to a position as near as possible, from the position instructed to be written to in the radial direction of the optical disk, if such an alternate destination is determined in accordance with the third priority, the concentration of data is maintained, and the operating efficiency at the time of performing data reading can be improved.

For example, track #4 is a track for user data, and the data instructed to be written is user data. In this case, even if the user data generated by the alternate process is recorded to track #3, since the distance of the radial direction of the optical disk is sufficiently short between the area of the recorded user data and track #4, the concentration of the user data is maintained. In this way, since it may not be necessary to significantly move the irradiation area of laser light by the optical pick-up 95 at the time of performing reading of the user data, the operating efficiency will be improved.

[Description of the Data Recording Process]

Next, a specific process will be described, in which the recording/reproducing device 62 records data to the optical disk by applying any one of the first priority through to the fourth priority as necessary.

Figure 10:
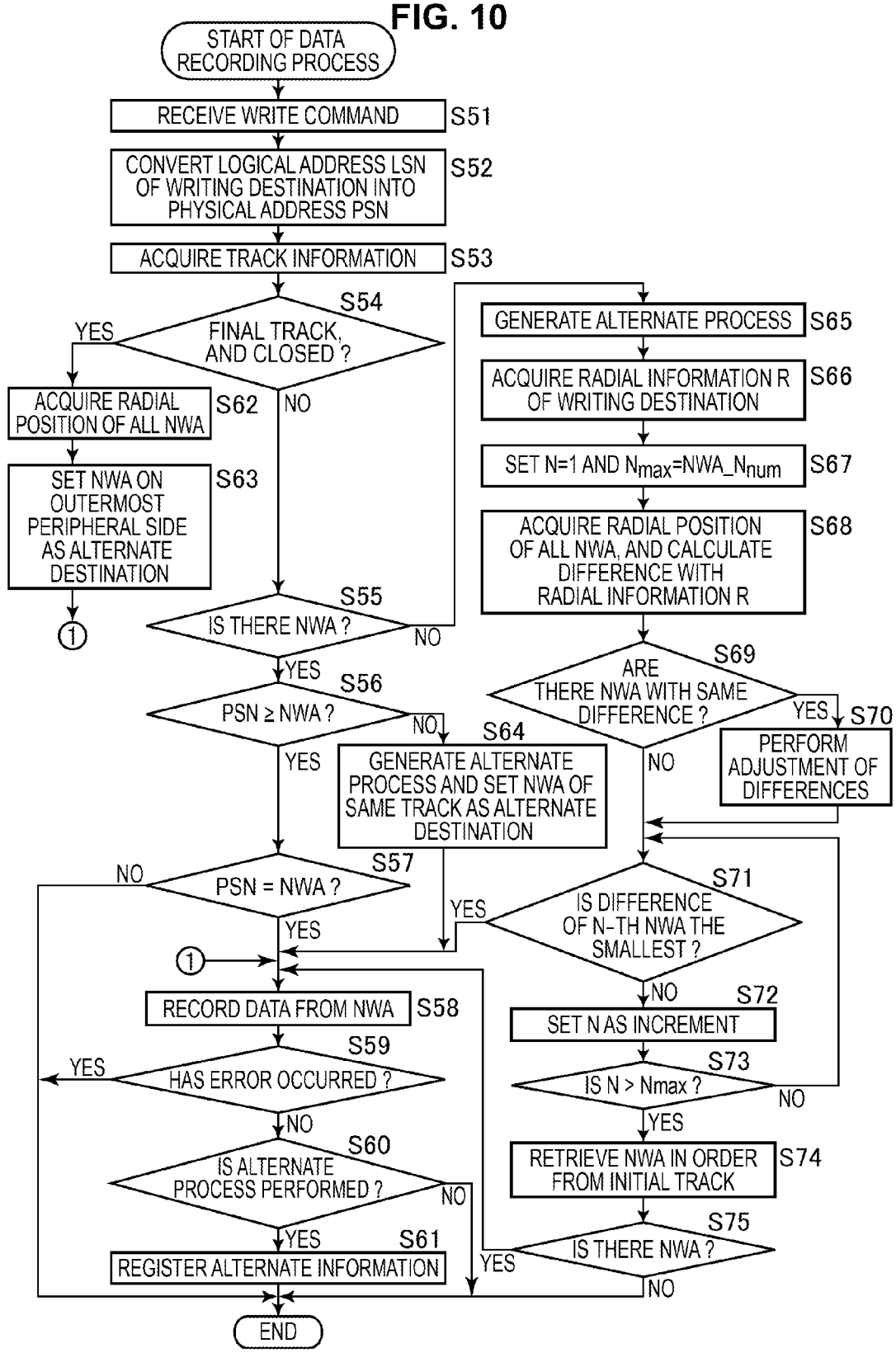
FIG. 10 is a flow chart which describes a data recording process.

That is, hereinafter, a data recording process, in which the recording/reproducing device 62 records data to the optical disk 11 in accordance with a write command from the drive control section 71, will be described with reference to the flow chart of FIG. 10.

In step S51, the controller 92 receives a write command supplied from the drive control section 71. In this case, the drive control section 71 supplies data to be written to the recording/reproducing processing section 94, and a logical address LSN is specified as a writing destination of this data in the write command.

In step S52, the controller 92 converts the logical address LSN specified as the writing destination of data in the received write command into a physical address PSN.

In step S53, the controller 92 acquires track information which is information related to a track including the position on the optical disk 11 shown by the acquired physical address PSN. Note that, hereinafter, the track including the position shown by the acquired physical address PSN will also be called the track for processing.

In step S54, the controller 92 judges whether or not the track for processing is the final track and is closed, based on the track information. That is, it is judged whether or not the condition of the first priority is satisfied at the time of performing the alternate process.

Here, the final track is the track positioned at the edge of the recording direction side on the recording layer positioned in the frontmost side, from among the tracks aligned along the recording direction of the optical disk 11.

In the case where it is judged that the track is not in the final position and is not closed in step S54, that is, in the case where the condition of the first priority is not satisfied, in step S55, the controller 92 judges whether or not there is an NWA in the track for processing.

In the case where it is judged that there is an NWA in step S55, in step S56, the controller 92 judges whether or not the physical address PSN specified as the writing destination is equal or more than the NWA of the track for processing, that is, whether or not PSN≥NWA.

In the case where it is judged that PSN≥NWA is satisfied in step S56, in step S57, the controller 92 judges whether or not the physical address PSN specified as the writing destination is equal to the NWA of the track for processing, that is, whether or not PSN=NWA.

In the case where it is judged that PSN=NWA is not satisfied in step S57, the controller 92 outputs a message to the drive control section 71 that there is a parameter error, and the data recording process ends. In this case, since the address position of the destination is specified as a writing destination from the NWA in the recording direction, it is set as a parameter error since sequential recording of data is not performed within the track.

On the other hand, in the case where it is judged that PSN=NWA is satisfied in step S57, in step S58, the controller 92 controls the recording/reproducing processing section 94 and the optical pick-up 95, and is made to record data from the NWA of the track for processing.

The recording/reproducing processing section 94 modulates the data supplied from the drive control section 71 as necessary, in accordance with the control of the controller 92, and supplies the modulated data to the optical pick-up 95. The optical pick-up 95 irradiates laser light to the track of the optical disk 11 in accordance with the data supplied from the recording/reproducing processing section 94, and records the data to the track.

For example, in the case where it is judged that PSN=NWA is satisfied, since the position of the NWA of the track for processing is specified as the position of the writing destination in the write command, the alternate process is not specifically performed, and data is sequentially written from the specified writing destination.

In step S59, the controller 92 judges whether or not an error has occurred at the time of performing recording of data. Note that there are cases where the error here is a write error even if a defect alternate or retry process is performed in the recording/reproducing device 62. Further, cases are also included for the write error, as a result of performing a write process by the side of the file system (drive control section 71).

In the case where it is judged that an error has occurred in step S59, the controller 92 outputs a message to the drive control section 71 that there has been a failure in the recording of data, and the data recording process ends.

On the other hand, in the case where it is judged that an error has not occurred in step S59, in step S60, the controller 92 judges whether or not an alternate process has been performed at the time of performing recording of data.

In the case where it is judged that an alternate process has not been performed in step S60, the controller 92 outputs a message to the drive control section 71 that the recording of data has been performed normally, and the data recording process ends.

On the other hand, in the case where it is judged that an alternate process has been performed in step S60, in step S61, the alternate processing section 101 registers information, to the effect that the actual writing destination of the physical address PSN specified as the writing destination has changed to an NWA which is the alternate destination, as alternate information.

When the alternate information is registered, the controller 92 outputs a message to the drive control section 71 that the recording of data has been performed normally, and the data recording process ends.

Further, in the case where it is judged that the track for processing is the final track and is closed in step S54, that is, in the case where the condition of the first priority is satisfied, the process proceeds to step S62. In this case, an alternate process is generated and the first priority is applied.

In step S62, the alternate processing section 101 acquires a position of the radial direction (hereinafter, simply called a radial position) of the NWA of all the tracks on the optical disk 11.

In step S63, the alternate processing section 101 sets the NWA positioned at the outermost peripheral side in the radial direction of the optical disk 11 as the NWA of the alternate destination, in accordance with the first priority and based on the radial position of the NWA of each track. In this way, in the example shown in FIG. 7, for example, the NWA3 of track #3 is selected as the alternate destination.

When the NWA of the alternate destination is determined, the process proceeds to step S58, and the data recording process performed by the processes of steps S58 through to step S61 ends. That is, data is recorded, sequentially, from the NWA set as the alternate destination towards the recording direction.

Further, in the case where it is judged that PSN≥NWA is not satisfied in step S56, that is, in the case where a position on the front side is specified in the recording direction from the NWA of the track for processing as the writing destination, the process proceeds to step S64. In this case, since an NWA exists within the track for processing, the condition of the second priority is satisfied.

In step S64, the alternate processing section 101 is made to generate an alternate process, and sets the NWA of the same track as the track of the writing destination as the alternate destination, in accordance with the second priority. In this way, in the example shown in FIG. 8, for example, the NWA1 of track #1, which is the track for processing, is selected as the alternate destination.

When the NWA of the alternate destination is determined, the process proceeds to step S58, and the data recording process performed by the processes of steps S58 through to step S61 ends. That is, data is recorded, sequentially, from the NWA set as the alternate destination towards the recording direction.

In addition, in the case where it is judged that there is no NWA in the track for processing in step S55, the process proceeds to step S65. In this case, since the conditions of the first priority and the second priority are not satisfied, the third priority or the fourth priority is applied as necessary.

Note that there are cases where judging that there is no NWA in the track for processing is for a track for processing which is a closed track, such as in the example shown in FIG. 9, for example.

In step S65, the alternate processing section 101 is made to generate an alternate process. Then, in the subsequent processes, it is specified whether there is a possibility of applying the third priority or the fourth priority.

In step S66, the alternate processing section 101 acquires radial information R of the position of the writing destination specified in the write command. Here, radial information R is information which shows the radial position of the physical address PSN specified as the writing destination.

In step S67, the alternate processing section 101 sets a variable N which specifies the NWA of the track on the optical disk 11 as 1, and sets a maximum value $N_{max}$ of the variable N as NWA_Num.

Here, the variable N shows which NWA of some numbered position along the recording direction the NWA for processing is, from the NWA of the edge of the side opposite to the recording direction of the layer L0, that is, of the edge portion of the inner peripheral side. Therefore, for example, in the case where there is an NWA in track #1, the N-th NWA specified by the variable N=1 becomes the NWA of track #1.

Further, the maximum value $N_{max}$=NWA_Num shows the number of NWA which exist in the tracks included in the optical disk 11.

In step S68, the alternate processing section 101 acquires the radial position of the NWA of all the tracks of the optical disk 11, and calculates a difference with the radial position specified by the radial information R.

In this way, a distance of the radial direction between the radial position of an NWA within a track and the radial position of the writing destination specified by the write command is obtained, for all the tracks which have an NWA on the optical disk 11, as a difference of the radial positions.

In step S69, the alternate processing section 101 judges whether or not there is a plurality of NWA in which this difference value is the same, from among the differences of the radial positions for the NWA of each track obtained in the process of step S68.

In the case where it is judged that there are NWA in which the difference is the same in step S69, in step S70, the alternate processing section 101 performs an adjustment of the differences.

Specifically, in the case where the data instructed to be recorded to the optical disk 11 by the write command is metadata (management information), the alternate processing section 101 reduces the difference of the NWA positioned in the innermost peripheral side of the optical disk 11, from among the NWA in which the difference is the same, by only a specific value.

In this way, for example, in the case where the NWA in which the difference is the same are NWA with the smallest difference, the fourth priority is applied, and the NWA positioned in the innermost peripheral side of the optical disk 11, from among these NWA, is selected as the alternate destination.

For example, such as shown in FIG. 5, since track #1 positioned in the innermost peripheral side in the layer L0 is set as the track for metadata, if considering the concentration of the metadata, it is desirable for each metadata to be recorded to the area of the inner peripheral side of the optical disk 11 as much as possible.

Accordingly, in the case where there is a plurality of NWA in which the difference is the same, the fourth priority is applied as necessary by appropriately adjusting the difference of the NWA positioned in the innermost peripheral side from among these NWA, and the areas to which the metadata is recorded can be concentrated to a specified area. As a result, the concentration of the metadata is maintained, and the reliability and operating efficiency of the metadata can be improved.

Further, in the case where the data instructed to be recorded to the optical disk 11 by the write command is a metadata mirror, the alternate processing section 101 reduces the difference of the NWA positioned in the outermost peripheral side of the optical disk 11, from among the NWA in which the difference is the same, by only a specific value.

In this way, for example, in the case where the NWA in which the difference is the same are NWA with the smallest difference, the fourth priority is applied, and the NWA positioned in the outermost peripheral side of the optical disk 11, from among these NWA, is selected as the alternate destination.

Even in this case, similar to the case for the metadata, since the areas specified by the metadata mirror can be concentrated to a specified area, the concentration of the metadata mirror is maintained, and the reliability and operating efficiency of the metadata mirror can be improved. Further, since the metadata and the metadata mirror are reasonably dispersed, it is possible to have hardly any influence from defects or the like, and the reliability of the data can be increased.

In this way, when an adjustment of the difference of an NWA is arbitrarily performed, the process proceeds from step S70 to step S71.

In the case where an adjustment of the difference is performed in step S70, or it is judged that that there are no NWA in which the difference is the same in step S69, in step S71, the alternate processing section 101 judges whether or not the difference of the N-th NWA specified by the variable N is the smallest. That is, it is judged whether the difference of the N-th NWA is the smallest value of all the differences of the NWA.

In the case where it is judged that the difference of the N-th NWA is the smallest in step S71, the alternate processing section 101 set the N-th NWA as the alternate destination, in accordance with the third priority or the fourth priority by the alternate process.

In this way, in the example shown in FIG. 9, for example, the NWA3 which is the NWA with the shortest distance of the radial distance, from the position within track #4 specified as the writing destination, is selected as the alternate destination.

When the NWA of the alternate destination is determined, the process proceeds to step S58, and the data recording process performed by the processes of step S58 through to step S61 ends.

On the other hand, in the case where it is judged that the difference of the N-th NWA is not the smallest in step S71, in step S72, the alternate processing section 101 sets the variable N to an increment of 1.

In step S73, the alternate processing section 101 judges whether or not $N > N_{max}$ is satisfied, that is, whether or not all the NWA have been set for processing.

In the case where it is judged that $N > N_{max}$ is not satisfied in step S73, the process returns to step S71, and the above described processes are repeated. That is, a judgment of whether or not the difference is the smallest is performed for the next NWA.

On the other hand, in the case where it is judged that $N > N_{max}$ is satisfied in step S73, the process proceeds to step S74.

In step S74, the alternate processing section 101 retrieves the NWA set for the tracks, in the order along the recording direction from track #1, that is, from the initial track, which is on the edge of the inner peripheral side of the layer L0 of the backmost layer of the optical disk 11, up to the final track.

In step S75, the alternate processing section 101 judges whether or not there are NWA in the tracks of the optical disk 11, as a result of the retrieval in the process of step S74.

In the case where it is judged that there are NWA in step S75, the alternate processing section 101 sets an NWA obtained by the retrieval as the alternate destination, in the alternate process. When the NWA of the alternate destination is determined, the process thereafter proceeds to step S58, and the data recording process performed by the processes of step S58 through to step S61 ends.

On the other hand, in the case where it is judged that there are no NWA in step S75, the controller 92 outputs, to the drive control section 71, a message that a write error has occurred, and a message that there has been a failure in the recording of data by write protection, for example. When the messages are output, the data recording process will end.

As described above, when a write command is received, the recording/reproducing device 62 determines an alternate destination by applying the first priority through to the fourth priority as necessary, and records the specified data to the optical disk 11.

In this way, by determining the alternate destination by applying the first priority through to the fourth priority, the concentration and mirror dispersion of appropriate data is maintained, and the reliability and operating efficiency of the data can be improved.

[Description of the Data Capacity Acquisition Process]

Incidentally, for example, when the data is written to all the areas of prescribed tracks for different recording purposes in one layer (recording layer) of the optical disk 11, it may be necessary to divide the layer on the front side of this layer, and to set new tracks for different recording purposes.

In such a case, the drive control section 71 obtains a data capacity per one layer of the optical disk 11, and divides a layer targeted based on this data capacity into a number of tracks for different recording purposes. The data capacity here is the capacity of an area capable of being used as a track.

Figure 11:
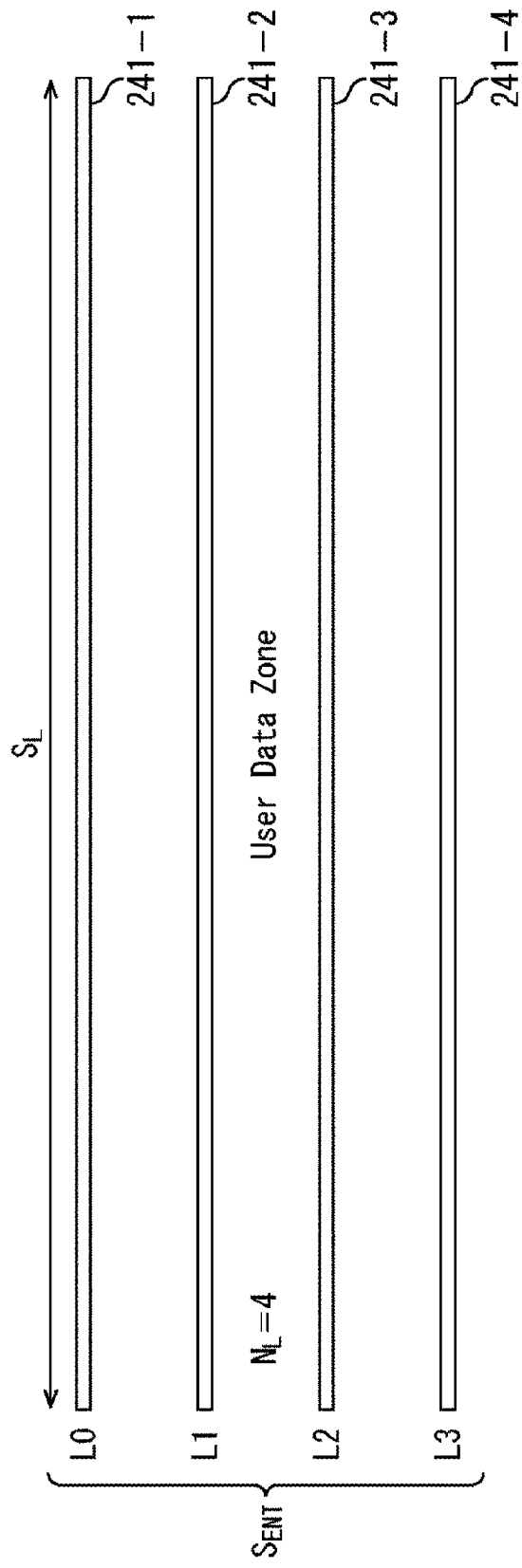
FIG. 11 is a figure which describes the acquisition of a data capacity.

For example, such as shown in FIG. 11, four recording layers 241-1 through to 241-4 are included in the optical disk, and the recording layers 241-1 through to 241-4 are set as layers L0 through to L3, respectively.

In this case, the layer number $N_L$ of the optical disk is 4, and the layer number $N_L$ is known information. Further, the data capacity $S_{ENT}$ of the entire optical disk is also known information. Therefore, the drive control section 71 can calculate the data capacity $S_L$ per one layer in the optical disk, from the data capacity $S_{ENT}$ and the layer number $N_L$. That is, the data capacity $S_L$ can be obtained by dividing the data capacity $S_{ENT}$ by the layer number $N_L$.

Figure 12:
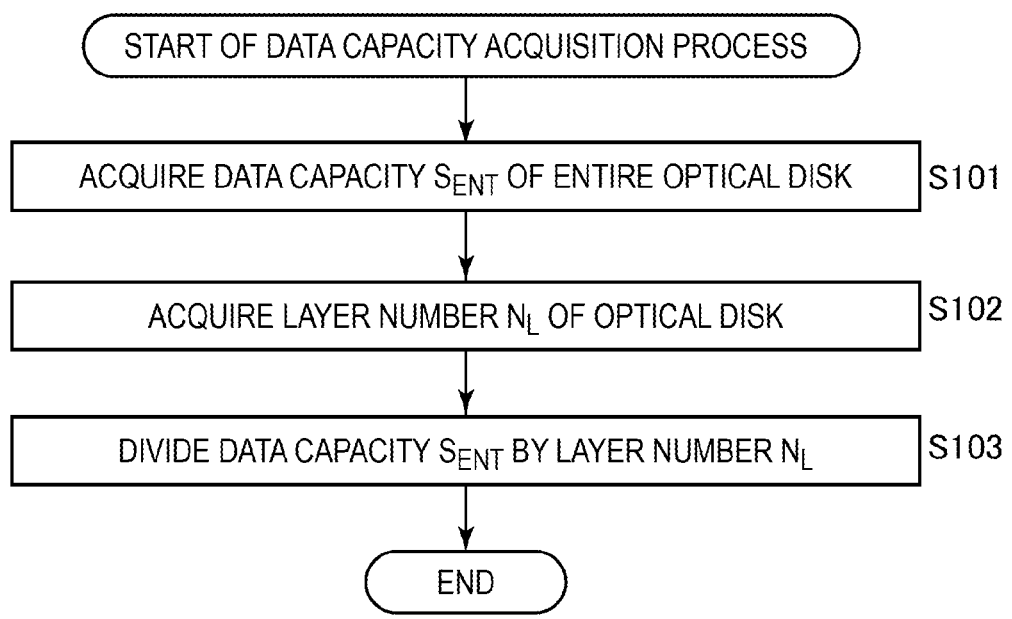
FIG. 12 is a flow chart which describes a data capacity acquisition process.

Here, a data capacity acquisition process, which is a process in which the host device 61 acquires the data capacity per one layer of the optical disk, will be described with reference to the flow chart of FIG. 12.

In step S101, the drive control section 71 acquires the data capacity $S_{ENT}$ of the entire optical disk 11.

In step S102, the drive control section 71 acquires the layer number $N_L$ of the optical disk 11.

For example, the data capacity $S_{ENT}$ and the layer number $N_L$ are each acquired from the controller 92 or the like. Specifically, for example, the controller 92 controls the recording/reproducing processing section 94 and the optical pick-up 95, is made to read the data capacity $S_{ENT}$ and layer number $N_L$ recorded as management information to the recording/reproducing processing section 94 from the optical disk 11, and is made to supply the data capacity $S_{ENT}$ and layer number $N_L$ to the drive control section 71.

In step S103, the drive control section 71 calculates the data capacity $S_L$ per one layer of the optical disk 11 by dividing the acquired data capacity $S_{ENT}$ by the layer number $N_L$.

As describe above, the host device 61 calculates the data capacity of the entire optical disk 11, and the data capacity per one layer from the layer number of the optical disk. The host device 61 divides the layers (tracks) of the optical disk 11 into a number of tracks, by using such an obtained data capacity per one layer. Note that the data capacity acquisition process may be performed at a timing which divides the layers, or may be performed in advance prior to the dividing of the layers.

[Description of the Track Division Process]

Next, a process will be described which is performed in the case where additional prescribed layers (tracks) are divided into a number of tracks, after an initial state is set by dividing each layer into a number of tracks.

Figure 13:
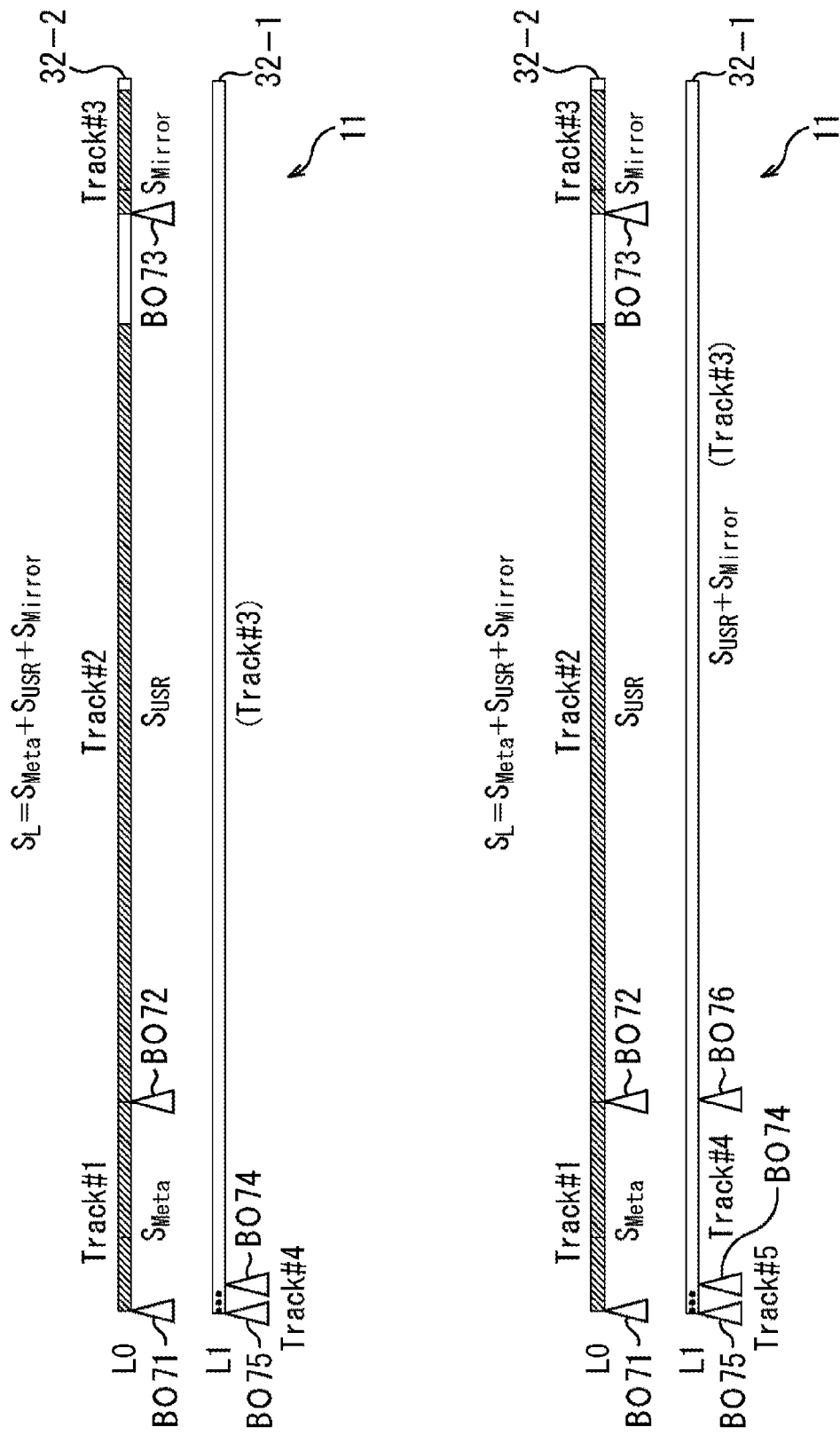
FIG. 13 is a figure which describes the division of tracks.

For example, such as shown in the upper part of FIG. 13, the recording layer 32 of the optical disk 11 is divided into tracks #1 through to #4. Note that, the same reference numerals in FIG. 13 denote parts corresponding to the case of FIG. 5, and the description of them will be suitably omitted. Further, in FIG. 13, the area of the shaded portion on the tracks represents the areas in which data recording is completed, and boundary positions BO71 through to the BO76 represent the boundary positions of each of the tracks.

In this example, the left side within the figure is the inner peripheral side of the optical disk 11, and the recording directions of the layer L0 and the layer L1 are towards the right and left directions within the figure, respectively.

In the example shown in the upper part of FIG. 13, tracks #1 through to #3 are set from the inner peripheral side of the optical disk 11 in the layer L0, and track #3 is set extending over to the layer L1. Further, track #3 and track #4 are set from the outer peripheral side of the optical disk 11 in the layer L1, and track #4 is already closed.

Here, track #1 is a track for metadata, and track #2 is a track for user data. Further, track #3 is a track for a mirror, and track #4 is a track for an AVDP and RVDS.

In addition, the data capacity per one layer is $S_L$, and the data capacity of the areas of track #1, track #2, and track #3 in the layer L0 are $S_{Meta}$, $S_{USR}$, and $S_{Mirror}$, respectively.

In such a state, the recording of data progresses to track #1, and track #1 within the layer L0 is closed. In this case, since track #1 is a track for metadata, and there are no other tracks for metadata in either the layer L0 or the layer L1, it may be necessary to set a new track for metadata in the layer L1.

Accordingly, the division section 81 of the drive control section 71 outputs a command to the controller 92, and divides track #3 so that the size of track #3 in the layer L1 becomes $S_{USR}$ $S_{Mirror}$. In this way, track #3 is divided by the boundary position BO76 such as shown in the lower part within the figure. That is, track #3 up to here is split into a new track #3 and a new track #4. Then, new track #4 obtained by the track division is set as a track for metadata, and the area set as track #4 up to here is set as a new track #5 such as shown in the lower part within the figure.

In this way, in the case where track #1 for metadata is closed, the layer L1 on one front side of the layer L0, in which this track #1 is set, is divided, and a new track for metadata is set at approximately the same position as that of track #1 in the radial direction of the optical disk 11 on the layer L1.

By performing such a track division, since the tracks for each metadata are set to an approximately same position of the radial direction, the metadata is concentrated in a specified area, even in the case where each layer is divided into a number of tracks, and the reliability and operating efficiency of the data can be improved. Further, the tracks for metadata can be simply expanded while maintaining the robustness of the data.

Moreover, even in the case where data is written to new track #4 for metadata, data is already recorded to all the areas in track #1 on the back side of this track #4. Therefore, by performing writing of data to track #4, laser light is diffused at the area where data recording of track #4 has been completed, at the time of performing writing of data to the tracks of the back side, and data can be prevented from not being written correctly.

Figure 14:
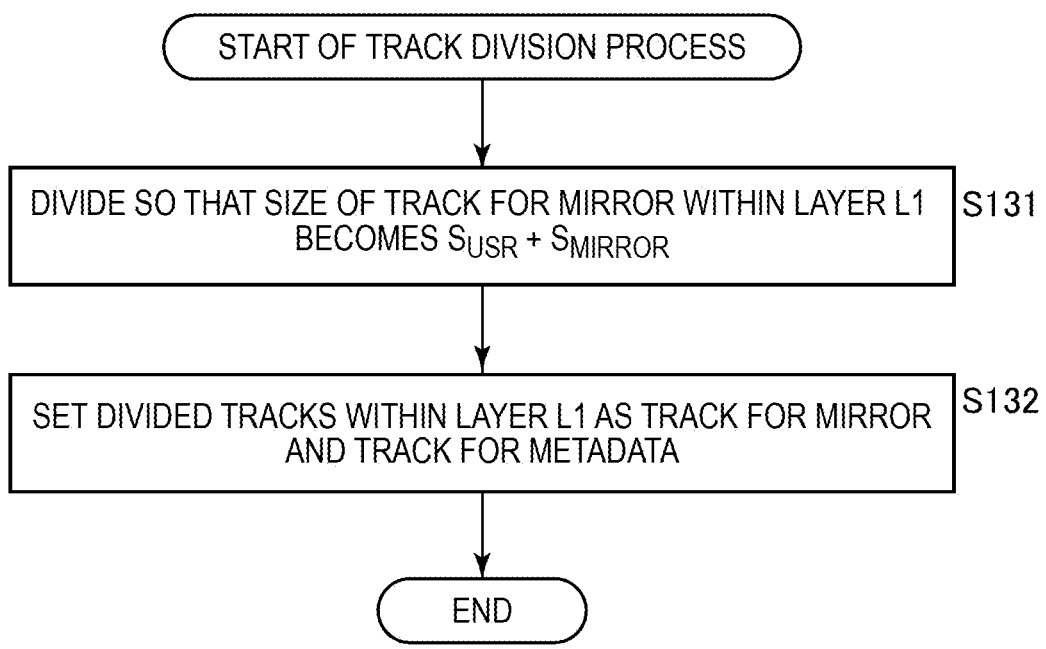
FIG. 14 is a flow chart which describes a track division process.

Next, a track division process, which is executed by the host device 61 in the case where a track division such as that shown in FIG. 13 is performed, will be described with reference to the flow chart of FIG. 14. This track division process begins when the track for metadata is closed.

In step S131, the division section 81 divides the track for a mirror so that the size of the track for a mirror within the layer L1 becomes $S_{USR}+S_{Mirror}$. That is, the track for a mirror is divided so that the size of all tracks for the mirror set across the layer L0 and the layer L1 becomes $S_{USR}+2\times S_{Mirror}$.

Specifically, the division section 81 instructs, to the controller 92, the division of the track for a mirror, and makes the controller 92 execute track division. In this way, for example, track #3 shown in the upper part of FIG. 13 is divided into two tracks.

In step S132, the division section 81 sets a track of the side opposite to the recording direction, along the recording direction, as a track for a mirror, and sets a track of the recording direction side as a track for metadata, from among the tracks obtained by the division, and the track division process ends.

When such a track is divided, the metadata is recorded from the position of the NWA of the track set as a new track for metadata by the division. For example, in the example shown in the lower part of FIG. 13, track #4 is set as a track for metadata, the leading position of track #4 is set as an NWA, and the metadata is recorded from the position of this NWA.

As described above, when the track for metadata is closed, the host device 61 sets a new track for metadata at an approximately same position of the radial direction in the layer of one front side of this track, and performs recording of the metadata.

Figure 15:
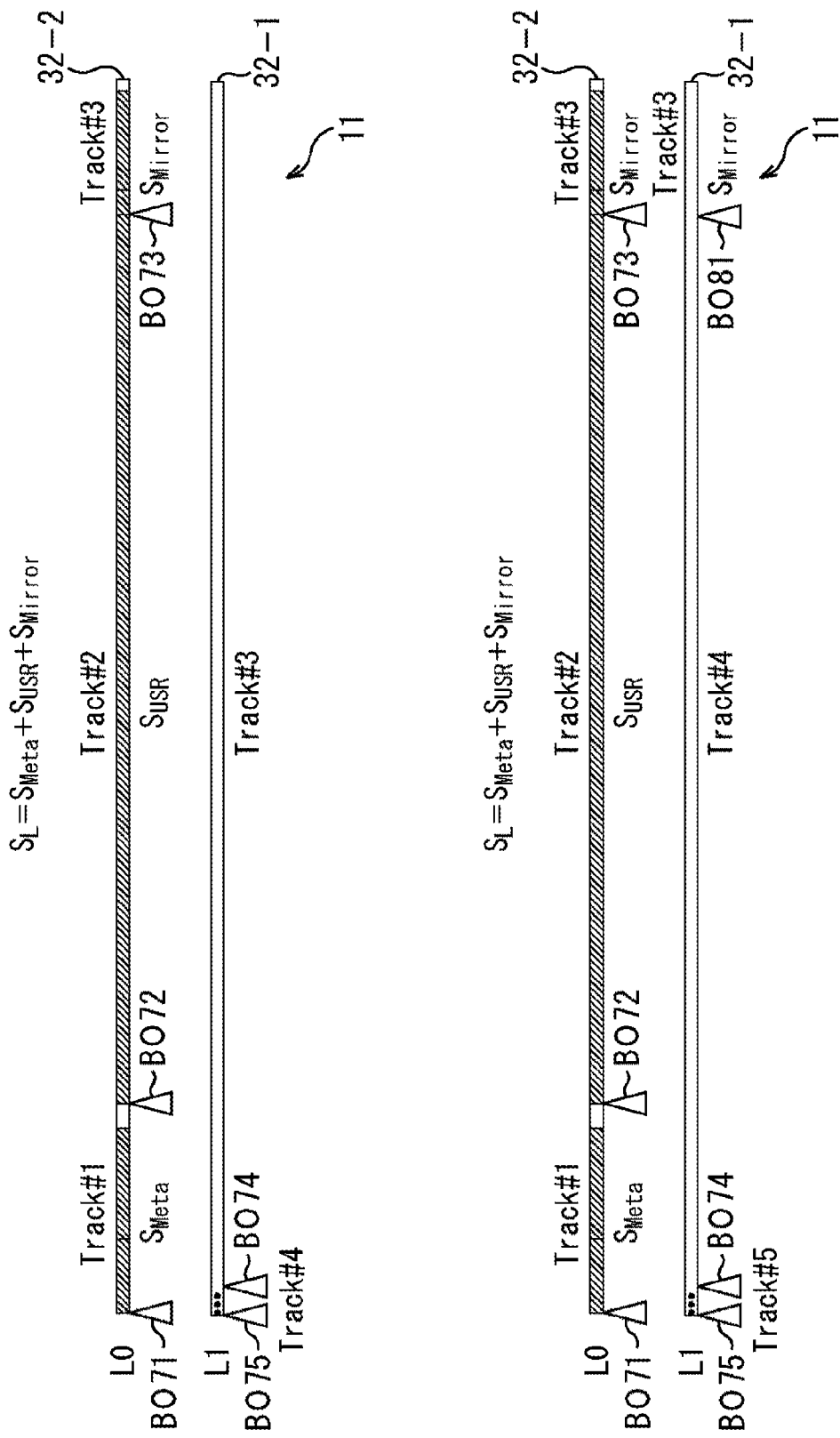
FIG. 15 is a figure which describes the division of tracks.

Further, for example, such as shown in the lower part of FIG. 15, in a state in which tracks #1 through to #4 are set in the optical disk 11, data is written to track #2, which is a track for user data, and track #2 is closed. Note that, the same reference numerals in FIG. 15 denote parts corresponding to the case of FIG. 13, and the description of them will be suitably omitted.

In the state shown in the upper part of FIG. 15, tracks #1 through to #4 are set as a track for metadata, a track for user data, a track for a mirror, and a track for an AVDP and RVDS, respectively. In such a state, the recording of data progresses to track #2, and track #2 within the layer L0 is closed. In this case, since track #2 is a track for user data, and there are no other tracks for user data in either the layer L0 or the layer L1, it may be necessary to set a new track for user data in the layer L1.

Accordingly, the division section 81 outputs a command to the controller 92, and divides track #3 so that the size of track #3 after division is $2 \times S_{Mirror}$. In this way, track #3 is divided by the boundary position BO81 such as shown in the lower part within the figure, and is set as a new track #3 and a new track #4. Then, new track #4 obtained by the track division is set as a track for user data, and the area set as track #4 up to here is set as a new track #5 such as shown in the lower part within the figure.

In this way, in the case where track #2 for user data is closed, the layer L1 on one front side of the layer L0, in which this track #2 is set, is divided, and a new track for user data is set at approximately the same position as that of track #2 in the radial direction of the optical disk 11 in the layer L1.

By performing such a track division, since the tracks for user data of each layer are set to an approximately same position of the radial direction, the user data is concentrated in approximately the center of each layer, and the operating efficiency can be improved at the time of performing writing and reading of the data. Further, at the time when performing writing of data to the tracks, the generation of laser light diffusion can be prevented in the areas in which data recording of the tracks is completed on this front side, and the data can be written correctly.

Figure 16:
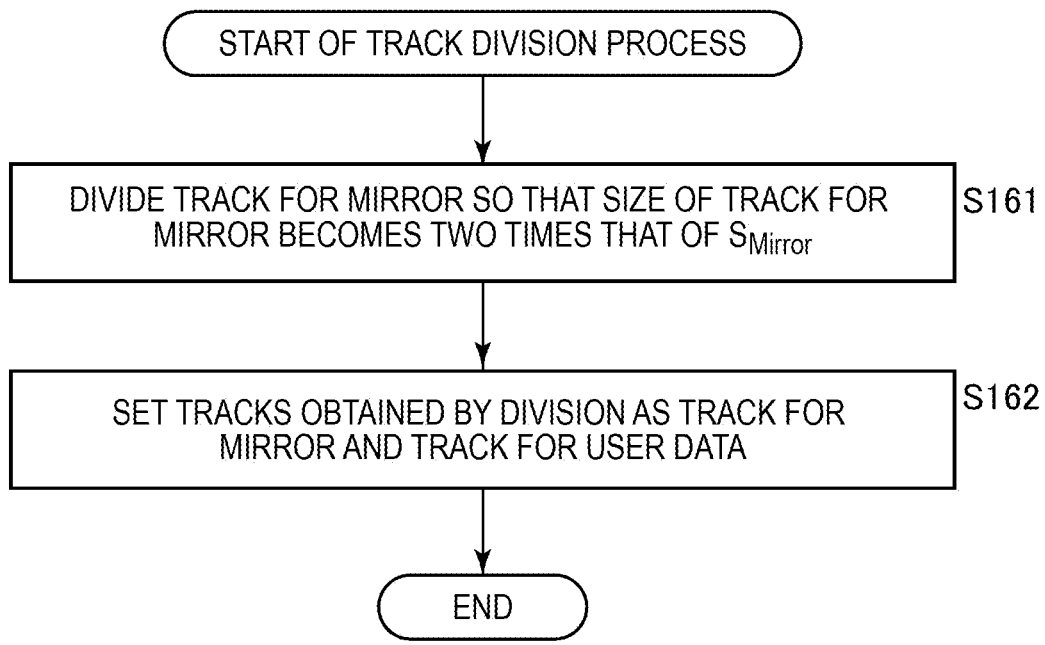
FIG. 16 is a flow chart which describes a track division process.

Next, a track division process, which is executed by the host device 61 in the case where a track division such as that shown in FIG. 15 is performed, will be described with reference to the flow chart of FIG. 16. This track division process starts when the track for user data is closed.

In step S161, the division section 81 divides the track for a mirror so that the size of the track for a mirror becomes twice the size of $S_{Mirror}$. That is, the track for a mirror is divided so that the size of all tracks for the mirror set across the layer L0 and the layer L1 becomes $2 \times S_{Mirror}$. In this way, for example, track #3 shown in the upper part of FIG. 15 is divided into two tracks.

In step S162, the division section 81 sets a track of the side opposite to the recording direction, along the recording direction, as a track for a mirror, and sets a track of the recording direction side as a track for user data, from among the tracks obtained by the division, and the track division process ends.

When such a track is divided, the user data is recorded from the position of the NWA of the track set as a new track for user data by the division. For example, in the example shown in the lower part of FIG. 15, track #4 is set as a track for user data, the leading position of track #4 is set as an NWA, and the user data is recorded from this position of this NWA.

As described above, when the track for user data is closed, the host device 61 sets a new track for user data at an approximately same position of the radial direction in the layer of one front side of this track, and performs recording of the user data.

In addition, for example, such as shown in the upper part of FIG. 17, the recording layer 32 of the optical disk 11 is divided into tracks #1 through to #6. Note that, the same reference numerals in FIG. 17 denote parts corresponding to the case of FIG. 5, and the description of them will be suitably omitted. Further, in FIG. 17, the area of the shaded portion on the tracks represents the areas in which data recording is completed, and boundary positions BO91 through to BO98 represent the boundary positions of each of the tracks.

In this example, the right side within the figure is the inner peripheral side of the optical disk 11, and the recording directions of the layer L0 and the layer L1 are towards the right and left directions within the figure, respectively.

In the example shown in the upper part of FIG. 17, tracks #1 through to #3 are set in this order along the recording direction from the inner peripheral side of the optical disk 11 in the layer L0, and track #3 is set extending over to the layer L1. Further, tracks #3 through to #6 are set in this order along the recording direction from the outer peripheral side of the optical disk 11 in the layer L1, and track #6 is already closed.

Here, track #1 and track #5 are tracks for metadata, and track #2 and track #4 are tracks for user data. Further, track #3 is a track for a mirror, and track #6 is a track for an AVDP and RVDS.

In addition, the data capacity per one layer is $S_L$, and the data capacity of the areas of track #1, track #2, and track #3 in the layer L0 are $S_{USR}$, and $S_{Mirror}$, respectively.

In such a state, the recording of data progresses to track #5, such as shown in the upper part within the figure, and track #5 within the layer L1 is closed. Note that at this time, track #2 is already closed, and the user data is recorded to part of track #4.

In this case, since track #5 is a track for metadata, and there are no other tracks for metadata in an open state, that is, in a state capable of recording the data, in the layer L0 and the layer L1, it may be necessary to set a new track for metadata in the layer L1.

Accordingly, the division section 81 outputs a command to the controller 92, and divides track #4, which is adjacent to track #5 in the layer L1 and is used as a track for user data up to here, into a track for user data and a track for metadata.

In this way, track #4 is divided by the boundary position BO98 such as shown in the lower part within the figure. That is, track #4 up to here is split into a new track #4 and a new track #5. Accordingly, the track for metadata set as track #5 up to here is set as a new track #6, and the track set as track #6 up to here is set as a new track #7. Then, new track #4 obtained by the track division is set as a track for user data as before, and a track adjacent to track #6 for metadata, from among the tracks obtained by the track division, is set as a new track #5 for metadata.

In this way, in the case where track #5 for metadata of the layer L1 is closed, the metadata can be concentrated in a specified area, by dividing track #4 which is adjacent to this track #5, and by setting one of the tracks adjacent to track #5 as a new track for metadata. In this way, the reliability and operating efficiency of the data can be improved.

Note that in FIG. 17, while the case has been described where track #2 is closed, and the writing of user data to track #4 is performed, a similar process is also performed in the case where there is not enough free capacity even if track #2 has not yet been closed.

Figure 18:
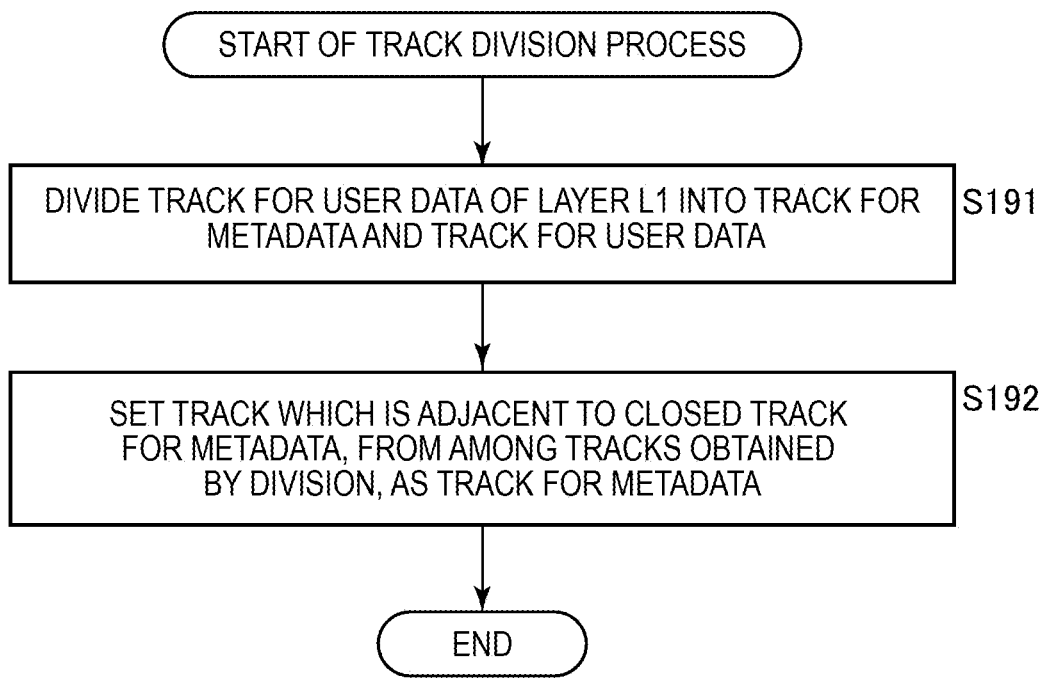
FIG. 18 is a flow chart which describes a track division process.

Next, a track division process, which is executed by the host device 61 in the case where a track division such as that shown in FIG. 17 is performed, will be described with reference to the flow chart of FIG. 18. This track division process starts when the track for metadata is closed.

In step S191, the division section 81 divides the track for user data, which is adjacent to the track for metadata within the layer L1, into a track for metadata and a track for user data.

Specifically, the division section 81 instructs, to the controller 92, the division of the track for user data, and makes the controller 92 execute track division. In this way, for example, track #4 shown in the upper part of FIG. 17 is divided into two tracks.

In step S192, the division section 81 sets a track adjacent to the closed track for metadata, from among the tracks obtained by the division, as a new track for metadata, sets the other track as a track for user data, and the track division process ends.

When such a track is divided, the metadata is recorded from the position of the NWA of the track set as a new track for metadata by the division. For example, in the example shown in the lower part of FIG. 17, track #5 is set as a track for metadata, the leading position of track #5 is set as an NWA, and the metadata is recorded from this position of this NWA. Further, in track #4, user data is recorded from this position of the NWA of track #4.

As described above, when the track for metadata is closed, the host device 61 divides the track positioned immediately before this track in the recording direction, and sets a track adjacent to the side of the closed track for metadata as a new track for metadata.

Figure 19:
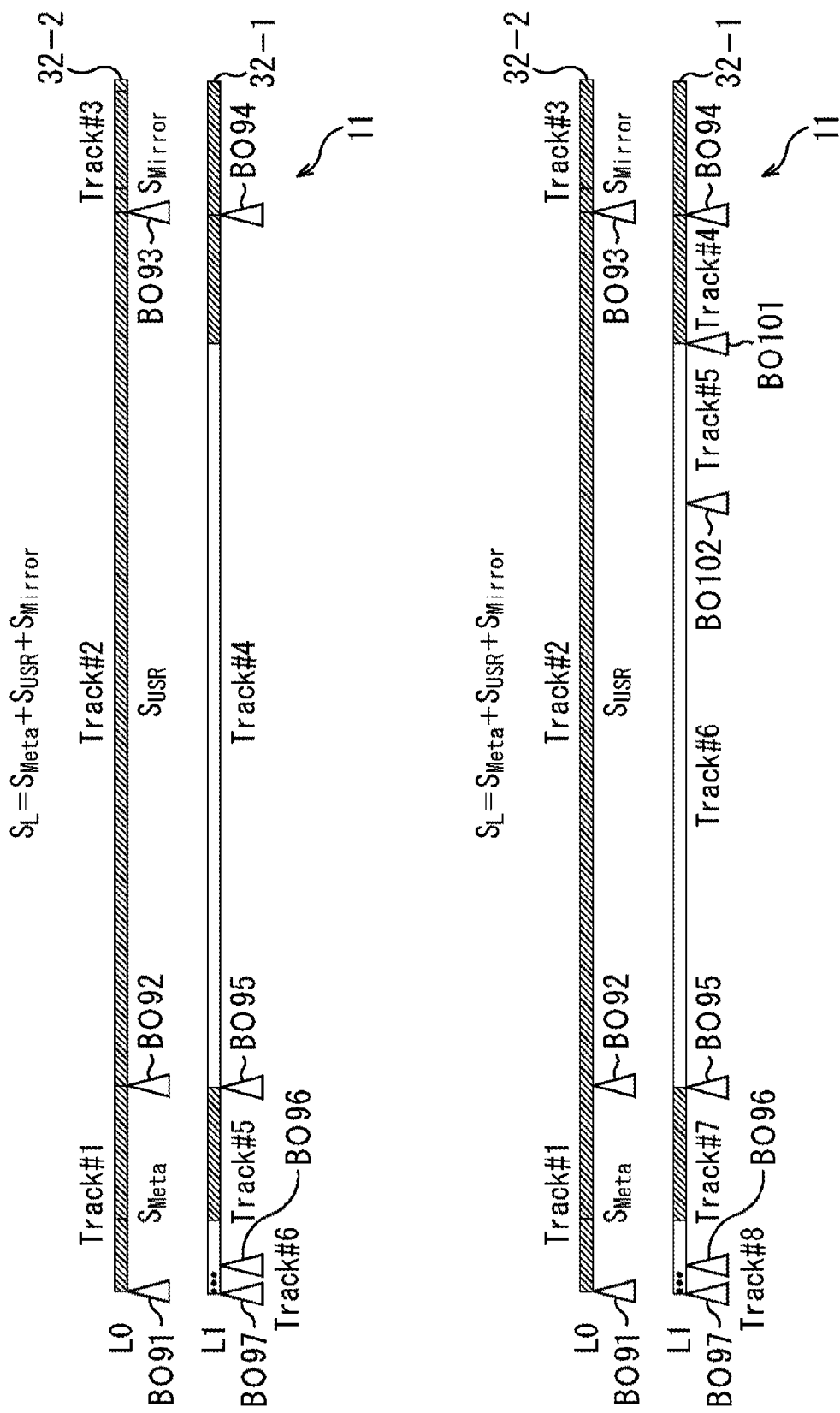
FIG. 19 is a figure which describes the division of tracks.

In addition, for example, such as shown in the upper part of FIG. 19, in a state in which tracks #1 through to #6 are set in the optical disk 11, data is written to track #3, which is a track for a mirror, and track #3 is closed. Note that, the same reference numerals in FIG. 19 denote parts corresponding to the case of FIG. 17, and the description of them will be suitably omitted.

The state shown in the upper part of FIG. 19 is a state approximately the same as that shown in the upper part of FIG. 17. However, the state shown in the upper part of FIG. 19 is a state in which track #3 for a mirror is closed. In this way, when track #3 is closed, since there are no other tracks for a mirror in either the layer L0 or the layer L1, it may be necessary to set a new track for a mirror in the layer L1. However, in this state, user data is already written to track #4 which is adjacent to track #3 in the layer L1.

Accordingly, the division section 81 outputs a command to the controller 92, and closes track #4 adjacent to track #3. Then, since a new track in which the writing of data has not yet been performed is included between closed track #4 and track #5, the division section 81 divides this track into two tracks.

Also, the division section 81 sets the track nearest to track #3 in the recording direction, from among the two tracks obtained by the division, as a new track for a mirror, and sets the other track as a track for user data.

In this way, for example, the area from the boundary position BO101 up to the boundary position BO102, which is adjacent to track #4 closed by the boundary position BO101 such as shown in the lower part within the figure, is set as a new track #5 for a mirror. Further, track #6 adjacent to track #5 is set as a track for user data. In addition, the tracks set as track #5 and track #6 up to here are set as a new track #7 and a new track #8, in accordance with the setting of these new tracks #5 and #6.

In this way, in the case where track #3 for a mirror is closed, and in the case where data has already been written to a part of track #4 which is adjacent to this track #3, track #4 is closed, and the one track obtained as a result of this is divided into two tracks. Then, the track closest to track #3 for a mirror, from among the tracks obtained by the division, is set as a new track for a mirror.

By performing such a track division, since the tracks for each mirror are set to a position as near as possible in the radial direction, a user data mirror is concentrated in a specified area, and the operating efficiency can be improved at the time of performing writing and reading of data.

Note that in FIG. 19, while the case has been described where track #3 is closed, a similar process is also performed in the case where there is not enough free capacity even if track #3 has not yet been closed.

Figure 20:
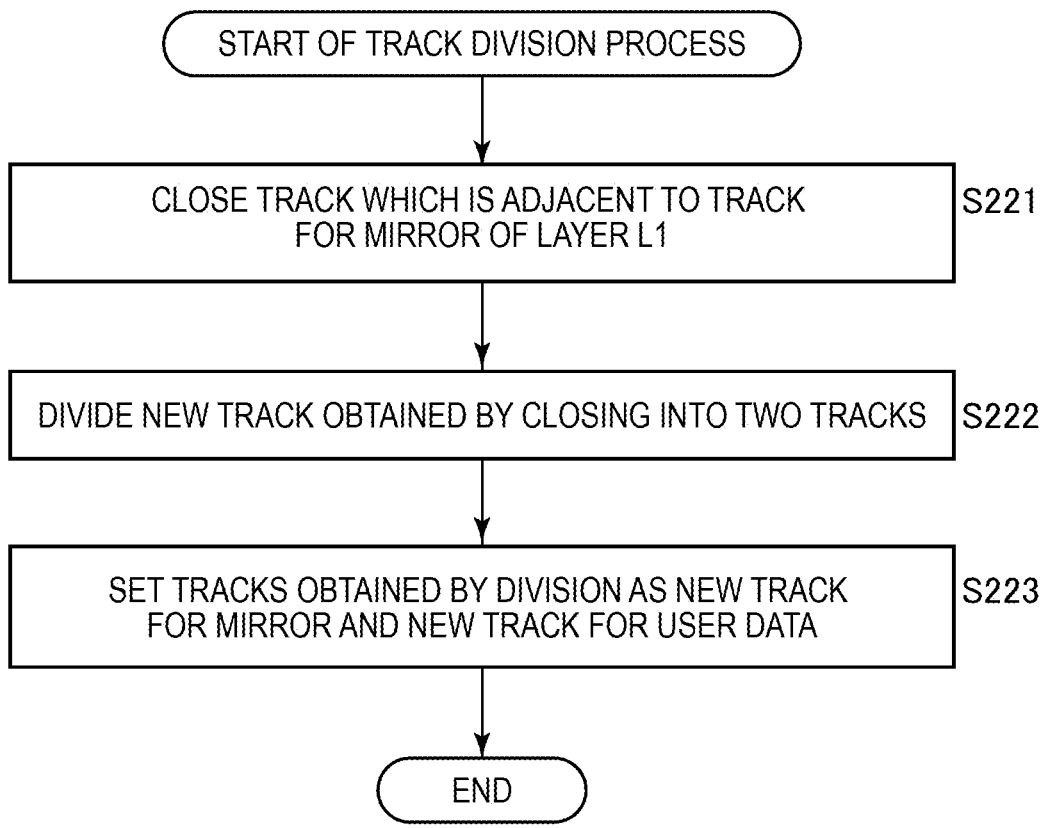
FIG. 20 is a flow chart which describes a track division process.

Next, a track division process, which is executed by the host device 61 in the case where a track division such as that shown in FIG. 19 is performed, will be described with reference to the flow chart of FIG. 20. This track division process starts, for example, when the track for a mirror is closed.

In step S221, the division section 81 closes the track for user data, which is adjacently included in the recording direction to the track for a mirror closed in the layer L1.

In step S222, the division section 81 divides the new track obtained by closing the track for user data in the process of step S221 into two tracks.

In step S223, the division section 81 sets a track on the side of the track for a mirror, that is, on the side of the closed track for user data, along the recording direction, from among the tracks obtained by the division, as a new track for a mirror, and sets the other track as a new track for user data. When such a new track for a mirror and a new track for user data are set, the track division process ends.

When such a track is divided, the user data mirror is recorded from the position of the NWA of the track set as a new track for a mirror by the division, and user data is recorded from the position of the NWA of the track set as a new track for user data.

As described above, when the track for a mirror is closed, the host device 61 closes the track which is adjacent to this track, divides the one track obtained as a result of this, and sets a new track for a mirror and a new track for user data.

The Second Embodiment

[The Boundary Position of the Track for a Mirror]

Incidentally, for example, a prescribed track on the layer L0 is closed, and track division is performed in the layer L1 positioned on the front side of the layer L0 in accordance with this.

In this case, there is a boundary position of another track at the back side of the boundary position of the newly set tracks within layer L1, that is, at the same radial position of the layer L0, and when there is an area in which data is unrecorded near to this boundary position, there is the possibility that the reliability at the time of performing data recording will decrease.

Figure 21:
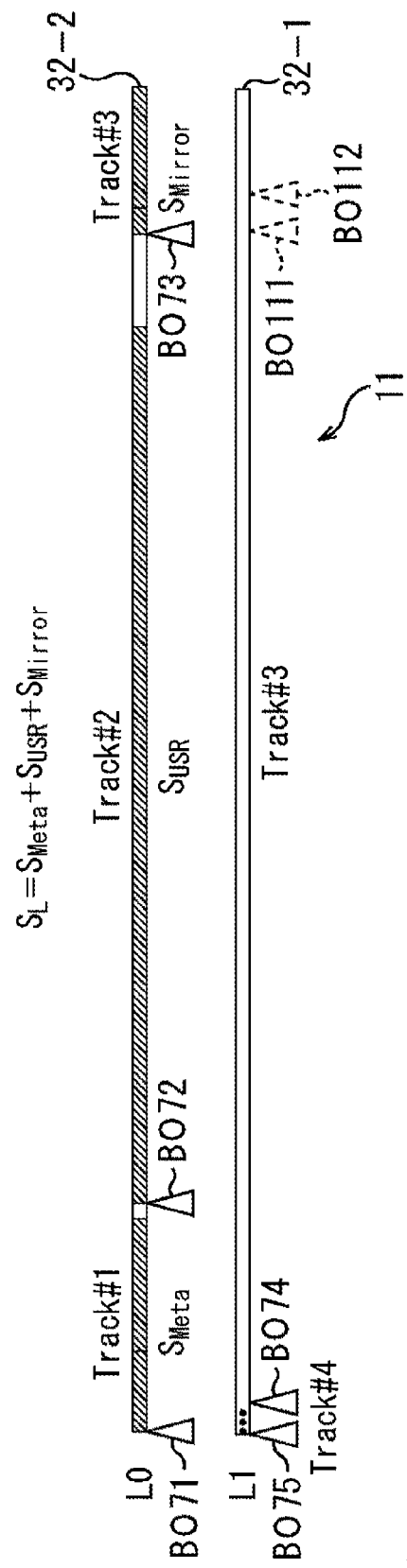
FIG. 21 is a figure which describes the division of tracks.

Specifically, for example, such as shown in FIG. 21, tracks #1 through to #3 are set in the layer L0, and data is written progressively to track #3. Note that, the same reference numerals in FIG. 21 denote parts corresponding to the case of FIG. 13, and the description of them will be suitably omitted.

In the example of FIG. 21, a part of the layer L0 and the layer L1 is set as the area of track #3. Further, data is recorded to a part of the area for track #2 positioned immediately before track #3 in the recording direction of data.

In this state, when data is recorded to all portions of track #3 in the layer L0, in the case where recording of data to track #3 has been instructed, data is written to the portion of track #3 in the layer L1.

In the layer L0, data has not yet been recorded to the area near the boundary position BO73 of track #2. Therefore, in the case where data is written progressively to track #3, when recording of the data is additionally performed to the recording direction side from a same radial position with the boundary position BO73, there will be an area in which data is unrecorded on the back side of the area in which data recording of track #3 is completed.

Then, in the case where recording of data is instructed for track #2, and laser light is irradiated to an area near the boundary position BO73 of track #2 by having the recording/reproducing device 62 record data, diffusion of laser light may occur in the area of track #3 on the front side. When such diffusion of laser light occurs, there is the possibility that data will not be correctly recorded to track #2, and the reliability of the data will decrease.

Therefore, in the recording/reproducing device 62, it may be necessary to close track #3, prior to when the area in which data recording of track #3 is completed in layer L1 reaches the same radial position as that of the boundary position BO73.

At present, track #3 is temporally closed at the position of the boundary position BO111. Here, the position of the boundary position BO111 is the same position as that of the boundary position BO73 in the radial direction of the optical disk 11. If track #3 is closed at the boundary position BO111, there will be no area in which data is already recorded on the front side of the area in which the data of track #2 is unrecorded.

However, strictly speaking, in the case where laser light is irradiated to the area near the boundary position BO73 of track #2, diffusion of laser light will occur at the boundary position BO111 due to influences such as a beam radius of laser light, and correct data may not be recorded to track #2.

Accordingly, in the case where track #3 is closed, the host device 61 includes a boundary position BO112 on the front side of the recording direction from the boundary position BO111, and the reliability of the data recorded to track #2 is improved by closing track #3 at this boundary position BO112. That is, diffusion of laser light is prevented by moving the final edge position of track #3 from the boundary position BO111 to the boundary position BO112.

Here, the amount that the final edge position of track #3 normally moves from the boundary position BO111 to the boundary position BO112, that is, the distance of the recording direction of data (hereinafter, called a buffer amount) will be different in accordance with the radial position of the boundary position BO111 (the boundary position BO73).

For example, when viewing the optical disk 11 from the direction of the laser incident surface 31, tracks for each of the layers (the recording layers 32), that is, the recording mark columns, are formed in a spiral shape from the center of the recording layer 32 towards the outer side. Here, when viewed from the laser incident surface 31, a buffer amount, which is the distance of the data recording direction between the boundary position BO111 and the boundary position BO112, is determined so as to include only two tracks (recording mark columns) between the boundary position BO111 and the boundary position BO112.

In such a case, the distance of the recording direction from the boundary position BO111 up to the boundary position BO112 changes according to which position of the radial direction of the optical disk 11, that is, at which radial position, the boundary position BO111 is positioned at. Even if this distance of the radial direction from the boundary position BO111 up to the boundary position BO112 is the same, in the case when viewed along the data recording direction, the distance of the recording direction from the boundary position BO111 up to the boundary position BO112 will become longer as the boundary position BO111 is placed more towards the outer peripheral side.

Accordingly, the division section 81 retains a buffer amount table in advance, in which the position of the radial direction (radial position) is associated with the buffer amount which is the distance of the data recoding direction to be moved to this radial position. Also, the division section 81 specifies a buffer amount associated with the radial position of the boundary position BO111, by referring to the retained buffer table, and determines the position of the boundary position BO112.

In this way, in the case where data is recorded to an unrecorded area of track #2, diffusion of laser light is prevented, and the reliability of the recorded data can be improved.

When generalizing, in the case where a track of a target layer is divided, near the boundary position of a track of the layer on the back side of the target layer (hereinafter, called the target boundary position) when viewed from the laser incident surface 31, data is not recorded to the area of the track adjacent to this target boundary position. That is, the area near the target boundary position of the track is an area in which data is unrecorded. In this case, in the other track which is adjacent to the target boundary position, the area near the target boundary position is an area in which data recording is completed.

In such a case, the division section 81 sets, in a track of the target layer set by the division from here, a position separated by only the buffer amount along the recording direction as a final boundary position, from the position of the same radial direction as that of the target boundary position (hereinafter, called a temporally boundary position), and track division of the target layer is performed. In this case, the final boundary position is a position, in the radial direction of the optical disk 11, which is positioned on the side of this other track from the temporally boundary position.

In this way, the final boundary position of the divided track becomes a position usually separated by only a constant distance from the target boundary position (the temporary boundary position), in the radial direction of the optical disk 11. Moreover, the final boundary position is moved from the target boundary position to the side of an area in which data recording is completed on the layer immediately below in the radial direction.

Even if laser light is irradiated near a target boundary position, which is obtained, for example, based on a beam radius of laser light or the like, if this constant distance is a distance in which diffusion of laser light occurs at the final boundary position, data can be recorded to a track adjacent to the target boundary position without diffusion of laser light occurring. That is, the reliability of data recording can be improved.

Figure 22:
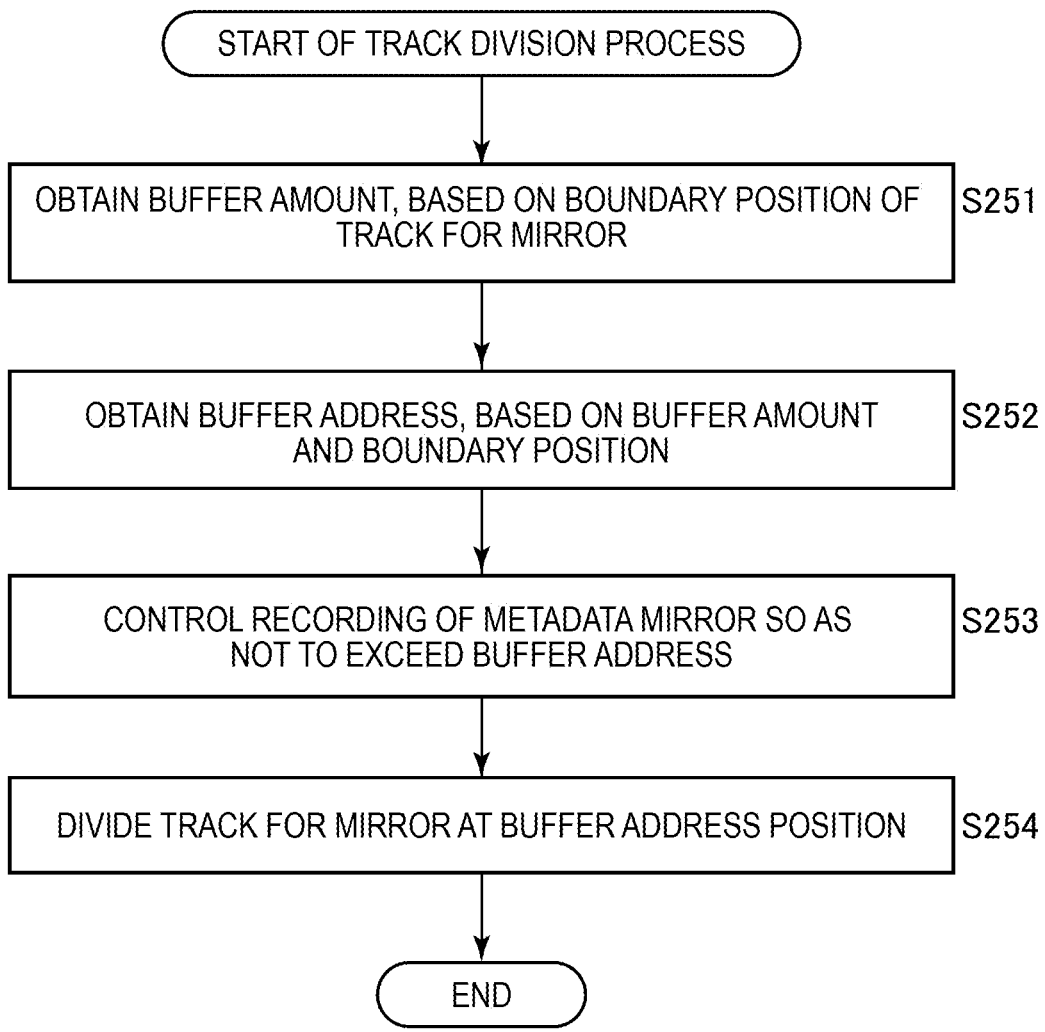
FIG. 22 is a flow chart which describes a track division process.

Next, a track division process, which is executed by the host device 61 in the case where a track division such as that shown in FIG. 21 is performed, will be described with reference to the flow chart of FIG. 22.

In step S251, the division section 81 obtains a buffer amount based on the boundary position of the track for a mirror. For example, in the example of FIG. 21, the division section 81 acquires a buffer amount by reading the buffer amount corresponding to the radial position of the boundary position BO73 of track #3, which is the track for a mirror, from the retained buffer amount.

In step S252, the division section 81 obtains a position to be the final edge of the track for a mirror as a buffer address, based on the obtained buffer amount and the boundary position of the track for a mirror. In this way, in the example of FIG. 21, the position of the boundary position BO112 to be the final edge position of track #3 is calculated as a buffer address.

In step S253, the drive control section 71 controls the recording of the metadata mirror so as not to exceed the obtained buffer address.

For example, in the example of FIG. 21, the drive control section 71 supplies a write command to the controller 92, supplies data to the recording/reproducing processing section 94, and writes data to track #3 so that the recording position of the data in the radial direction does not exceed the boundary position BO112 (the buffer address).

Then, when data is written up to the buffer address, in step S254, the division section 81 supplies a command to the controller 92, divides the track for a mirror at the buffer address position, and the track division process ends.

For example, in the example of FIG. 21, track #3 is closed at the position of the boundary position BO112, and the portion from the boundary position BO112 up to the boundary position BO74, which was the area of track #3 up to here, is set as a new track #4. Then, the portion from the boundary position BO74 up to the boundary position BO75, which was set as track #4 up to here, is set as a new track #5.

As described above, when data is written to all the areas of the layer L0, in the track for a mirror positioned in the outer peripheral side of the optical disk 11, the host device 61 obtains a buffer amount based on the radial position of the boundary position of this track for a mirror, and calculates a buffer address. Then, the host device 61 controls the recording of data for the track for a mirror in the layer L1 so that the writing of data is not performed by exceeding the position shown by the buffer address.

In this way, laser light is prevented from being diffused, at the time of performing data writing of the other track which is adjacent to the track for a mirror, and the reliability of the recording data can be improved.

[The Boundary Position of the Track for Metadata]

Figure 23:
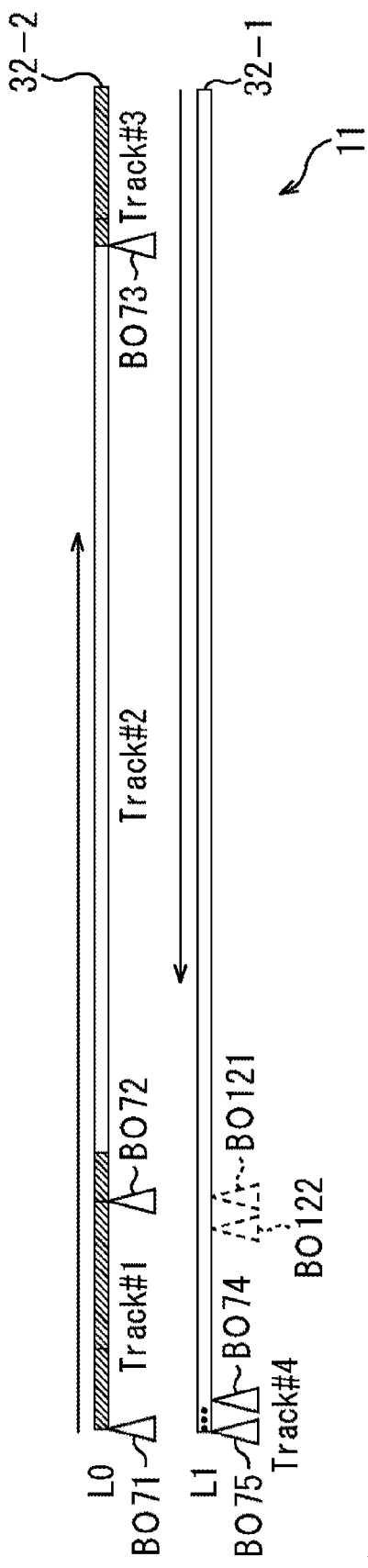
FIG. 23 is a figure which describes the division of tracks.

Further, for example, such as shown in FIG. 23, tracks #1 through to #3 are included in the layer L0, and data is written progressively to track #1. Note that, the same reference numerals in FIG. 23 denote parts corresponding to the case of FIG. 13, and the description of them will be suitably omitted.

In the example of FIG. 23, a part of the layer L0 and the layer L1 is set as the area of track #3. Further, data is recorded to a part of the area in track #2 positioned immediately after track #1 in the recording direction. In addition, it becomes a state in which track #3 and track #4 are set in the layer L1.

In such a state, data is written to the entire area of track #1 for metadata, and track #1 is closed. In this case, it may be necessary for the division section 81 to set a new track for metadata in the layer L1, by dividing track #3 of the layer L1.

In this example, since the writing of data to track #2 has hardly been performed, the unrecorded area of track #2, that is, the NWA2, is positioned near the boundary position BO72. Therefore, the boundary position BO121 is set to the position of the layer L1 which has the same radial direction as that of the boundary position BO72, and when this boundary position BO121 is set as a boundary position of a new track #4, there is the possibility that the reliability of the data recorded to track #2 will decrease, similar to that of the example of FIG. 21. That is, in the case where data is written to track #2, there is the possibility that data will not be correctly written to track #2, by diffusion of laser light occurring at the boundary position BO121.

Accordingly, the division section 81 obtains a buffer amount based on the radial position of the boundary position BO72 (the boundary position BO121), and the boundary position of new track #4 moves from the boundary position BO121 in the radial direction of the data by only the buffer amount. In this case, the direction in which the boundary position moves is set as the direction of the side of track #1, that is, of the side to which data is already recorded in the layer L0, in the radial direction. Then, the boundary position BO122, which is the position the boundary position BO121 has moved to, is set as a boundary position of new track #4.

That is, the area from the boundary position BO73 up to the boundary position BO122 is set as a new track #3, the area from the boundary position BO122 up to the boundary position BO74 is set as a new track #4 for metadata, and track #4 up to here is set as a new track #5. Further, data is written in the recording direction from the boundary position BO122 to new track #4 for metadata.

In this way, laser light can be prevented from being diffused in the new track boundaries on the front side, at the time of performing data recording to the layer of the back side, by moving the boundary positions of the new tracks to the side at which data is already recorded in the layer of the back side. As a result of this, the reliability of the recorded data can be improved.

Figure 24:
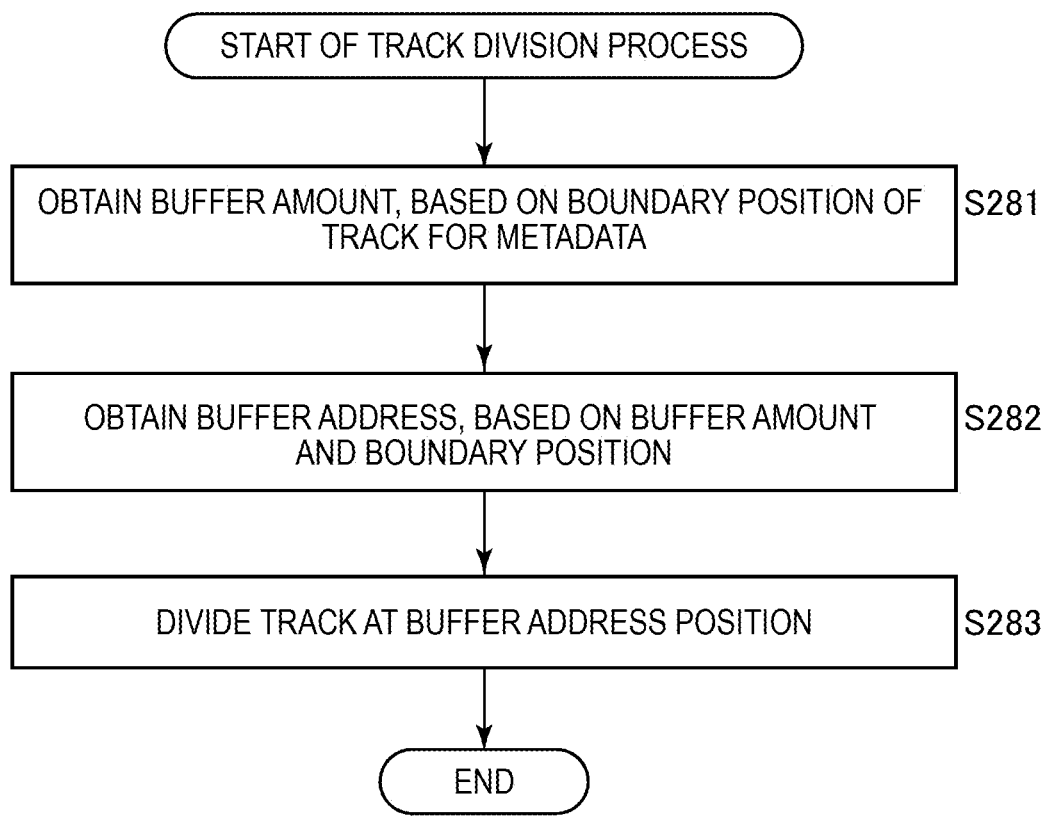
FIG. 24 is a flow chart which describes a track division process.

Next, a track division process, which is executed by the host device 61 in the case where a track division such as that shown in FIG. 23 is performed, will be described with reference to the flow chart of FIG. 24.

In step S281, the division section 81 obtains a buffer amount based on the boundary position of the track for metadata. For example, in the example of FIG. 23, the division section 81 acquires a buffer amount by reading the buffer amount corresponding to the radial position of the boundary position BO72 of track #1, which is the track for metadata, from the retained buffer amount.

In step S282, the division section 81 obtains a position to be the initial edge of a new track for metadata as a buffer address, based on the obtained buffer amount and the boundary position of the track for metadata. In this way, in the example of FIG. 23, the position of the boundary position BO122 is calculated as a buffer address.

In step S283, the division section 81 supplies a command to the controller 92, divides the track for a mirror at the buffer address position, and the track division process ends.

For example, in the example of FIG. 23, track #3 is divided at the position of the boundary position BO122, and the area from the boundary position BO122 up to the boundary position BO74 is set as a new track #4 for metadata. Further, the portion from the boundary position BO74 up to the boundary position BO75, which was set as track #4 up to here, is set as a new track #5.

As described above, when data is written to all the areas of the track for metadata of the layer L0, the host device 61 obtains a buffer amount based on the radial position of the boundary position of this track for metadata, and calculates a buffer address. Then, the host device 61 sets the position shown by the buffer address as the boundary position of a new track for metadata in the layer L1. In this way, laser light is prevented from being diffused, at the time of performing data writing of the other track which is adjacent to the track for metadata, and the reliability of the recording data can be improved.

[The Boundary Position of the Track for User Data]

Figure 25:
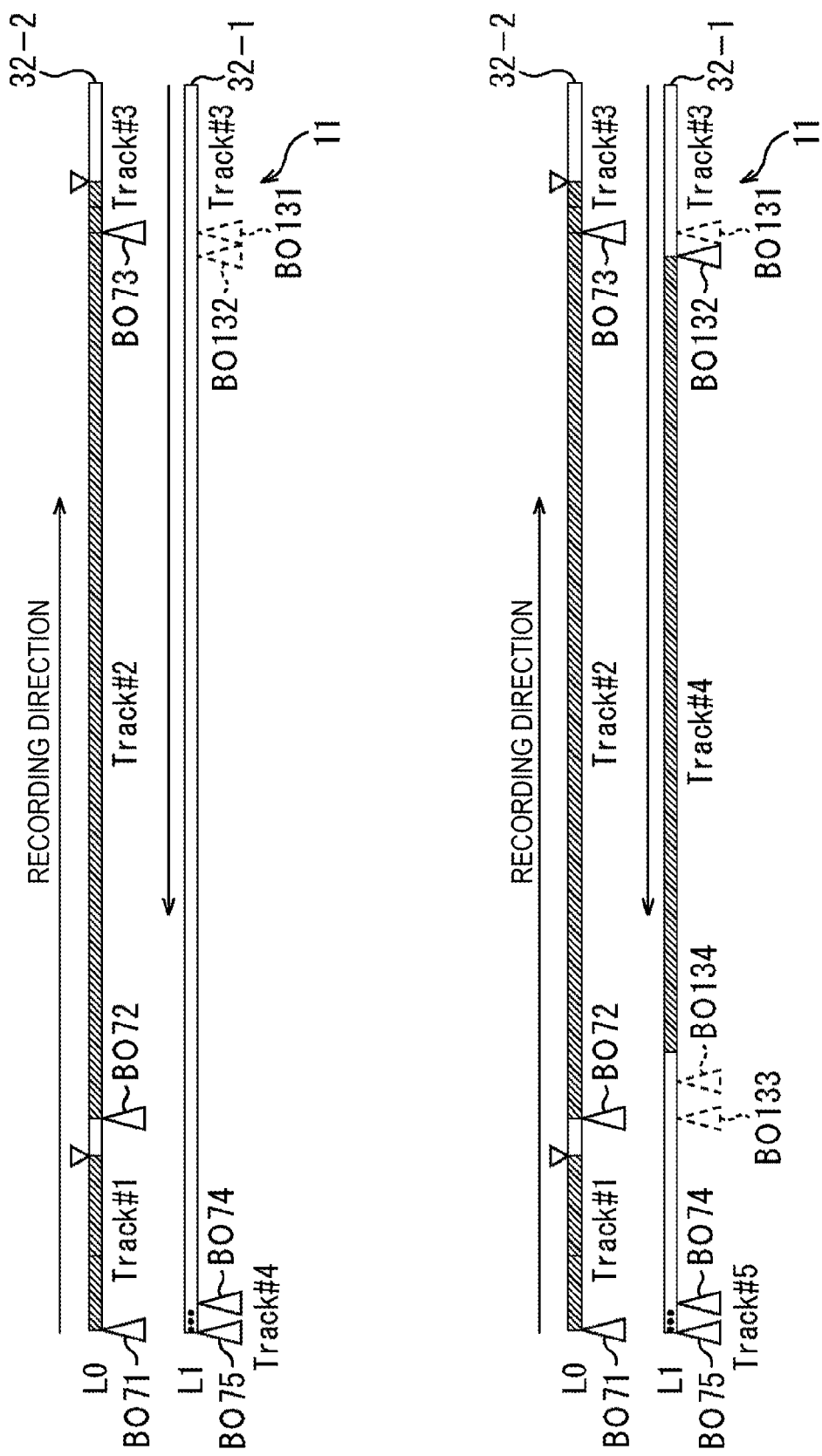
FIG. 25 is a figure which describes the division of tracks.

In addition, for example, such as shown in the upper part of FIG. 25, tracks #1 through to #3 are included in the layer L0, and data is written progressively to track #2. Note that, the same reference numerals in FIG. 25 denote parts corresponding to the case of FIG. 15, and the description of them will be suitably omitted.

In the example of the upper part of FIG. 25, a part of the layer L0 and the layer L1 is set as the area of track #3. Further, an unrecorded area remains on track #1 and track #3 in the layer L0, and data is written to the entire area in track #2. In addition, it becomes a state in which track #3 and track #4 are set in the layer L1.

In this way, data is written to the entire area of track #2 for user data, and track #2 is closed. In this case, it may be necessary for the division section 81 to set a new track for user data in the layer L1, by dividing track #3 of the layer L1.

In this example, since the writing of data to track #3 has hardly been performed, the unrecorded area of track #3, that is, the NWA3 is positioned near the boundary position BO73.

Therefore, the boundary position BO131 is set to the position of the layer L1 which has the same radial position as that of the boundary position BO73, and when this boundary position BO131 is set as the boundary position of a new track #4 for user data, there is the possibility that the reliability of the data recorded in track #3 will decrease. That is, in the case where data is written to track #3, there is the possibility that data will not be correctly written to track #3 of the layer L0, by diffusion of laser light occurring at the boundary position BO131.

Accordingly, the division section 81 obtains a buffer amount based on the radial position of the boundary position BO73 (the boundary position BO131), and the boundary position of new track #4 moves from the boundary position BO131 in the radial direction of the data by only the buffer amount. In this case, the direction in which the boundary position moves is set as the direction of the side of track #2, that is, of the side to which data is already recorded in the layer L0, in the radial direction. Then, the boundary position BO132, which is the position the boundary position BO131 has moved to, is set as a boundary position of new track #4.

That is, the area from the boundary position BO73 up to the boundary position BO132 is set as a new track #3, the area from the boundary position BO132 up to the boundary position BO74 is set as a new track #4 for user data, and track #4 up to here is set as a new track #5.

Then from here onwards, in the case where new user data is recorded to the optical disk 11, data is written towards the recording direction, from the boundary position BO132 of new track #4.

As a result of this, for example, data is written progressively to track #4 such as shown in the lower part within the figure, and the area in which data recording of track #4 is completed reaches up to near a radial position the same as that of the boundary position BO72. In this case, it may be necessary for the division section 81 to close track #4.

In this example, since there are unrecorded areas in track #1, the boundary position BO133 is set at the position of the layer L1 which has the same radial position as that of the boundary position BO72, and if the boundary position BO133 is set as the boundary position of track #4, there is the possibility that the reliability of the data recorded to track #1 will decrease. That is, in the case where data is written to track #1, there is the possibility that data will not be correctly written to track #1 of the layer L0, by diffusion of laser light occurring at the boundary position BO133.

Accordingly, the division section 81 obtains a buffer amount based on the radial position of the boundary position BO72, and the boundary position of closed track #4 moves from the boundary position BO133 in the radial direction of the data by only the buffer amount. In this case, the direction in which the boundary position moves is set as the direction of the side of track #2, that is, of the side to which data is already recorded in the layer L0, in the radial direction. Then, the boundary position BO134, which is the position the boundary position BO133 has moved to, is set as a boundary position of closed track #4.

That is, track #4 is closed at the boundary position BO134, and the area from the boundary position BO134 up to the boundary position BO74 is set as a new track #5 for metadata. Further track #5 up to here is set as a new track #6.

In this way, laser light can be prevented from being diffused in the new track boundaries on the front side, at the time of performing data recording to the layer of the back side, by moving the boundary positions of the new tracks to the side at which data is already recorded in the layer of the back side. As a result of this, the reliability of the recorded data can be improved.

Figure 26:
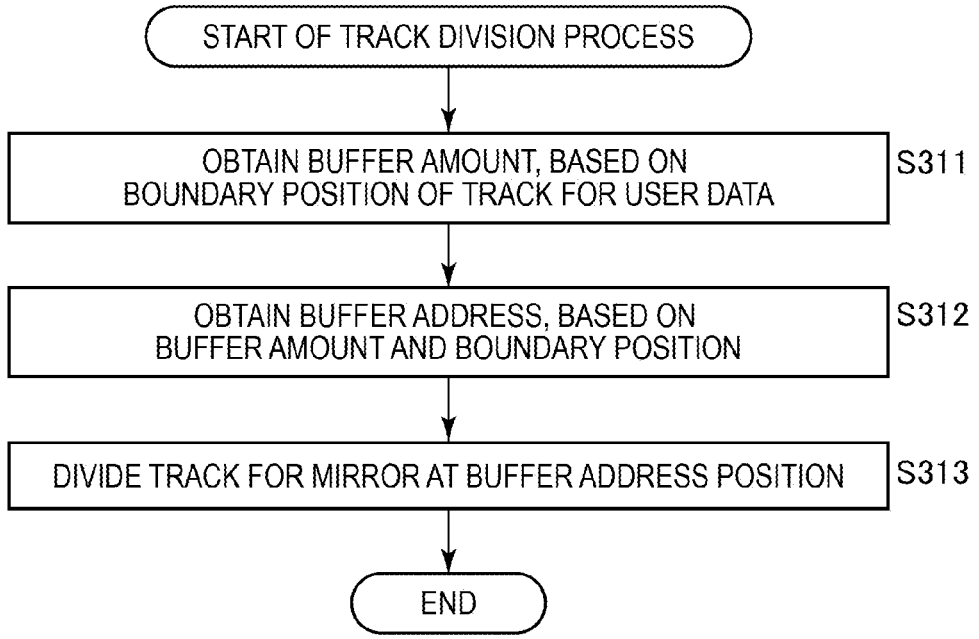
FIG. 26 is a flow chart which describes a track division process.

Next, a track division process, which is executed by the host device 61 in the case where a track division such as that shown in the upper part of FIG. 25 is performed, will be described with reference to the flow chart of FIG. 26.

In step S311, the division section 81 obtains a buffer amount based on the boundary position of the track for user data. For example, in the example of FIG. 25, the division section 81 acquires a buffer amount by reading the buffer amount corresponding to the radial position of the boundary position BO73 of track #2 from the retained buffer amount.

In step S312, the division section 81 obtains a position to be the boundary position of a new track for user data as a buffer address, based on the obtained buffer amount and the boundary position of the track for user data. In this way, in the example of FIG. 25, the position of the boundary position BO132 is calculated as a buffer address.

In step S313, the division section 81 supplies a command to the controller 92, divides the track for a mirror at the buffer address position, and the track division process ends.

For example, in the example of FIG. 25, track #3 is divided at the position of the boundary position BO132, and the area from the boundary position BO132 up to the boundary position BO74 is set as a new track #4 for user data. Further, the track, which was set as track #4 up to here, is set as a new track #5.

As described above, when data is written to all the areas of the track for user data of the layer L0, the host device 61 obtains a buffer amount based on the radial position of the boundary position of this track for user data, and calculates a buffer address. Then, the host device 61 sets the position shown by the buffer address as the boundary position of a new track for user data in the layer L1. In this way, laser light is prevented from being diffused, at the time of performing data writing of the other track which is adjacent to the track for user data, and the reliability of the recording data can be improved.

Figure 27:
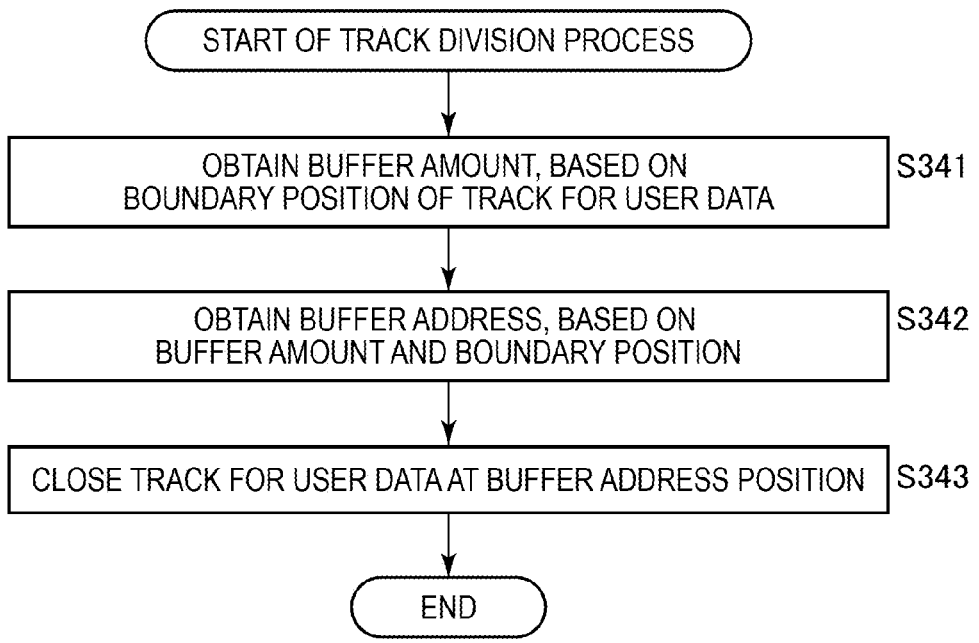
FIG. 27 is a flow chart which describes a track division process.

In addition, a track division process, which is executed by the host device 61 in the case where a track division such as that shown in the lower part of FIG. 25 is performed, will be described with reference to the flow chart of FIG. 27.

In step S341, the division section 81 obtains a buffer amount based on the boundary position of the track for user data. For example, in the example of FIG. 25, the division section 81 acquires a buffer amount by reading the buffer amount corresponding to the radial position of the boundary position BO72 of track #2 from the retained buffer amount.

In step S342, the division section 81 obtains a position to be the boundary position of a closed track for user data as a buffer address, based on the obtained buffer amount and the boundary position of the track for user data. In this way, in the example of FIG. 25, the boundary position BO134 is calculated as a buffer address.

In step S343, the division section 81 supplies a command to the controller 92, closes the track for user data at the buffer address position, and the track division process ends.

For example, in the example of FIG. 25, track #4 is closed at the position of the boundary position BO134, and as a result of this, the area from the boundary position BO134 up to the boundary position BO74 is set as a new track #5 for metadata. Further, the track, which was set as track #5 up to here, is set as a new track #6.

As described above, when data is written progressively to the track for user data of the layer L1, up to near the area of the radial position the same as that of the boundary position of the track for user data of the layer L0, the host device 61 obtains a buffer amount based on this radial position, and calculates a buffer address. Then, the host device 61 closes the track for user data of the layer L1 at the position shown by the buffer address. In this way, laser light is prevented from being diffused, at the time of performing data writing of the other track which is adjacent to the track for user data of the layer L0, and the reliability of the recording data can be improved.

[The Optical Disk]

Note that, heretofore, while an example has been described in which recording layers are included on one surface of an optical disk, mounted on the recording/reproducing device 62, to which data is recorded and from which data is read, recording layers may be included on both surfaces of the optical disk.

Figure 28:
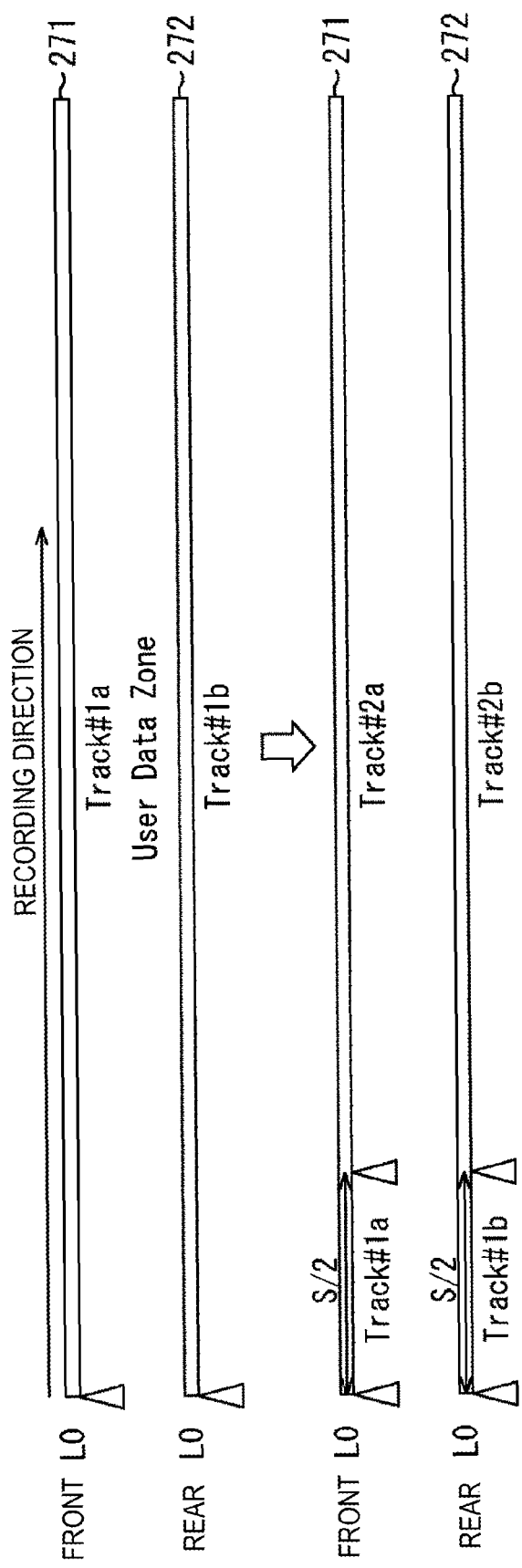
FIG. 28 is a figure which describes the securing of tracks.

In such a case, for example, such as shown in the upper part of FIG. 28, a recording layer 271 on a first back side of the front surface of the optical disk is set as a layer L0 of the front surface, and track #1a is set in this recording layer 271. Further, a recording layer 272 on a first front side of the rear surface of the optical disk is set as a layer L0 of the rear surface, and track #1b is set in this recording layer 272.

Also, when the setting of tracks with a data capacity S in the layers L0 is instructed by a reserve track command, the layer L0 of the front surface of the optical disk is divided, such as shown in the lower part within the figure, and track #1a with a data capacity S/2 is secured. In this case, the area apart from track #1a of the recording layer 271 is set as track #2a.

Similarly, the layer L0 of the rear surface of the optical disk is divided, track #1b with a data capacity S/2 is secured, and the area apart from track #1b of the recording layer 272 is set as track #2b.

Then, in the case where data is written to the layers L0, data is recorded, for example, alternately to track #1a and track #1b for a prescribed data amount. That is, recording of data by striping is performed.

Figure 29:
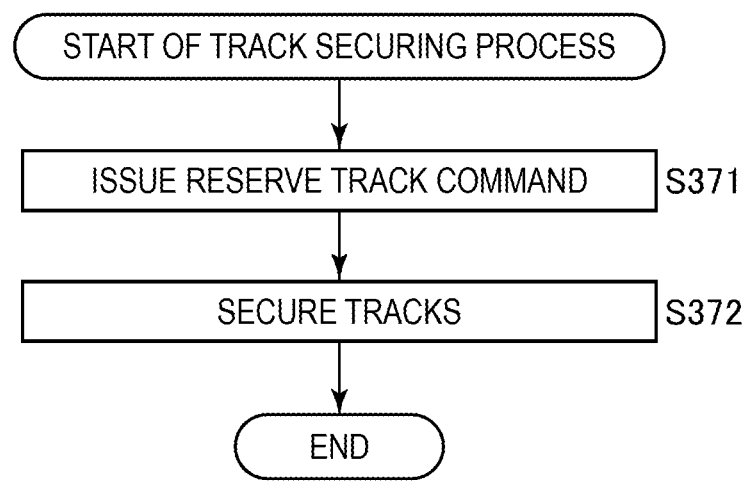
FIG. 29 is a flow chart which describes a track securing process.

Next, a track securing process, in which the host device 61 secures the tracks in the optical disk by a reserve track command, will be described with reference to the flow chart of FIG. 29.

In step S371, the host device 61 issues a reserve track command by specifying a data capacity S of the track to be secured, and supplies the reserve track command to the drive control section 71.

Then, in step S372, the drive control section 71 controls the controller 92 in accordance with the reserve track command, and secures the track in the optical disk mounted in the recording/reproducing device 62.

For example, the drive control section 71 divides the specified data capacity S by two, and obtains S/2. Then, the drive control section 71 secures a track, in which the data capacity is S/2, on each of the front surface and the rear surface of the optical disk, which is a double sided disk. In this way, for example, track #1a and track #1b shown in FIG. 28 are secured. When the tracks are secured, the track securing process will end.

Note that in the case where the data capacity S is not divided into 2, the drive control section 71 sets an error, and the track securing process ends. Further, in the case where the optical disk is a single sided disk such as that of the optical disk 11, the tracks with a data capacity S are secured in one layer.

As described above, the host device 61 secures necessary tracks on the optical disk.

In this way, when tracks are secured on an optical disk which is a double sided disk, as described above, data is recorded alternately to the front surface and the rear surface. Therefore, in the case where an optical disk mounted in the recording/reproducing device 62 is constituted by a plurality of recording layers on each side, a process similar to that described in the above described embodiments is performed.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) A recording control device, including:

a recording control section which controls data recording to a recording medium by irradiating laser light to the recording medium, the recording medium having a plurality of recording layers on which data recording is performed, and having a number of sequential recording ranges for different recording purposes on each of the recording layers; and a division section which divides the sequential recording range of a prescribed recording layer, near a boundary of two mutually adjacent sequential recording ranges of the recording layer on a back side of the prescribed recording layer when viewed from a laser incident surface of the recording medium, in a case where data is not recorded to an area of one of the two sequential recording ranges, by setting, as a division position in the prescribed recording layer, a position separated by only a prescribed distance, from a position identical to a position of the boundary, on the other side of the two sequential recording ranges in a direction connecting a center and outer peripheral of the recording medium.

(2) The recording control device according to (1), wherein the division section determines a buffer amount based on a position of the boundary in the direction, and sets, as the division position, a position separated by only the buffer amount along a recording direction of data, from a position identical to a position of the boundary on the prescribed recording layer in the direction.

(3) The recording control device according to (1) or (2), wherein at least one of the sequential recording range intended for recording of management information, the sequential recording range intended for recording of user data, and the sequential recording range intended for recording of mirror data of the management information, is formed on the recording layers.

(4) The recording control device according to any one of (1) to (3), wherein the sequential recording ranges are arranged, in the recording layers, in a spiral shape from the center to the outer peripheral of the recording layers.

(5) The recording control device according to any one of (1) to (4), wherein the recording medium is a recording medium in which a recording direction of data is different for the mutually adjacent recording layers.

The present disclosure contains subject matter related to that disclosed in Japanese Priority Patent Application JP 2012-224658 filed in the Japan Patent Office on Oct. 10, 2012, the entire content of which is hereby incorporated by reference.

What is claimed is:

1. A recording control device, comprising:
a recording control section which controls data recording on a recording medium having a plurality of recording layers, by irradiating laser light to the recording medium, wherein the recording medium comprises a number of sequential recording ranges for different recording purposes on each of the plurality of recording layers; and
a division section which divides one of the sequential recording ranges of a prescribed recording layer, near a boundary of two mutually adjacent sequential recording ranges of another recording layer,
wherein the other recording layer is disposed on a back side of the prescribed recording layer when viewed from a laser incident surface of the recording medium,
wherein when data is not recorded to an area of one of the two mutually adjacent sequential recording ranges, a division position is set in the prescribed recording layer, separated by a prescribed distance from a position identical to a position of the boundary, in a direction connecting a center and an outer periphery of the recording medium,
wherein the division section determines a buffer amount based on the position of the boundary in a radial direction, and sets the division position in the prescribed recording layer separated by the buffer amount, from the position identical to the position of the boundary in the prescribed recording layer.

2. The recording control device according to claim 1, wherein at least one of the sequential recording ranges that records management information, user data, and mirror data of the management information, is formed on the plurality of recording layers.

3. The recording control device according to claim 1, wherein the sequential recording ranges are arranged, in each of the plurality of recording layers, in a spiral shape from the center to the outer periphery of each of the plurality of recording layers.

4. The recording control device according to claim 1, wherein a recording direction of data on the recording medium is different for mutually adjacent recording layers of the plurality of recording layers.

5. The recording control device according to claim 1, wherein the number of the sequential recording ranges on each of the plurality of recording layers is determined based on a data capacity of the recording medium.

6. The recording control device according to claim 1, wherein the division section determines the buffer amount based on the position of the boundary, and wherein the buffer amount depends on a radial position of the position identical to the position of the boundary on the prescribed recording layer.

7. The recording control device according to claim 1, wherein the buffer amount is determined from a buffer amount table, wherein the buffer amount table comprises one or more buffer amounts associated with a plurality of radial positions.

8. The recording control device according to a claim 1, wherein the division section is operable to calculate a buffer address based on the buffer amount.

9. The recording control device according to claim 1, wherein two recording layers of the plurality of recording layers are included between the position identical to the position of the boundary and the division position to determine the buffer amount.

10. A recording control device, comprising:
a recording control section which controls data recording on a recording medium having a plurality of recording layers, by irradiating laser light to the recording medium, wherein the recording medium comprises a number of sequential recording ranges for different recording purposes on each of the plurality of recording layers; and
a division section which divides one of the sequential recording ranges of a prescribed recording layer, near a boundary of two mutually adjacent sequential recording ranges of another recording layer,
wherein the other recording layer is disposed on a back side of the prescribed recording layer when viewed from a laser incident surface of the recording medium,
wherein a division position is set in the prescribed recording layer, separated by a prescribed distance from a position identical to a position of the boundary, in a direction connecting a center and an outer periphery of the recording medium,
wherein the division section determines a buffer amount based on the position of the boundary in a radial direction.

11. A recording control method, comprising:
controlling data recording on a recording medium by irradiating laser light to the recording medium having a plurality of recording layers, wherein the recording medium comprises a number of sequential recording ranges for different recording purposes on each of the plurality of recording layers;
dividing one of the sequential recording ranges of a prescribed recording layer, near a boundary of two mutually adjacent sequential recording ranges of another recording layer,
wherein the other recording layer is disposed on a back side of the prescribed recording layer when viewed from a laser incident surface of the recording medium,
wherein when data is not recorded to an area of one of the two mutually adjacent sequential recording ranges, a division position is set in the prescribed recording layer, separated by a prescribed distance from a position identical to a position of the boundary, in a direction connecting a center and an outer periphery of the recording medium; and
determining a buffer amount based on the position of the boundary in a radial direction, and setting the division position in the prescribed recording layer separated by the buffer amount, from the position identical to the position of the boundary in the prescribed recording layer.

* * * * *